United States Patent
Sugiyama et al.

(10) Patent No.: US 6,292,623 B1
(45) Date of Patent: Sep. 18, 2001

(54) DATA REPRODUCING METHOD, REPRODUCING SPEED CONTROL APPARATUS AND REPRODUCING APPARATUS

(75) Inventors: Akira Sugiyama; Tetsuya Iwamoto, both of Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 08/967,765

(22) Filed: Nov. 10, 1997

(30) Foreign Application Priority Data

Nov. 12, 1996 (JP) .................................. 8-300726

(51) Int. Cl.$^7$ .......................... H06N 5/782; H06N 5/7826
(52) U.S. Cl. ................................. 386/81; 386/68
(58) Field of Search .................... 386/81, 68, 74, 386/67, 46, 109, 111, 112, 1, 6, 7, 27, 33, 69

(56) References Cited

U.S. PATENT DOCUMENTS 5,237,424 * 8/1993 Nishino et al. ..................... 386/27
5,377,051 * 12/1994 Lane et al. .......................... 360/32

* cited by examiner

*Primary Examiner*—Robert Chevalier
(74) *Attorney, Agent, or Firm*—Frommer Lawrence & Haug LLP; William S. Frommer; Joe H. Shallenburger

(57) ABSTRACT

An image data reproducing method which is possible to obtain a search picture with high quality, a reproducing speed control apparatus, and a recording/reproducing apparatus by finding search speed that it is possible to reproduce image data as much as possible by using the most effectively plural reproducing heads in reproducing a search picture and by setting to the speed.

24 Claims, 40 Drawing Sheets

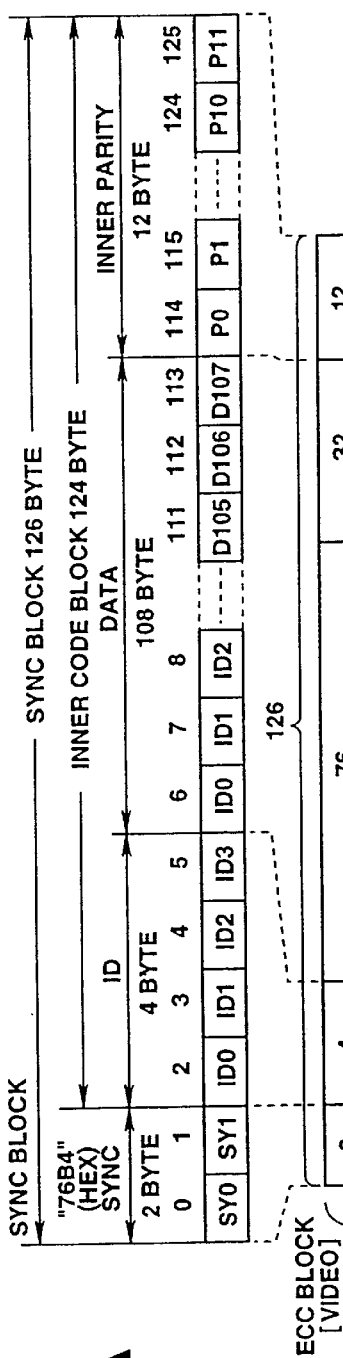
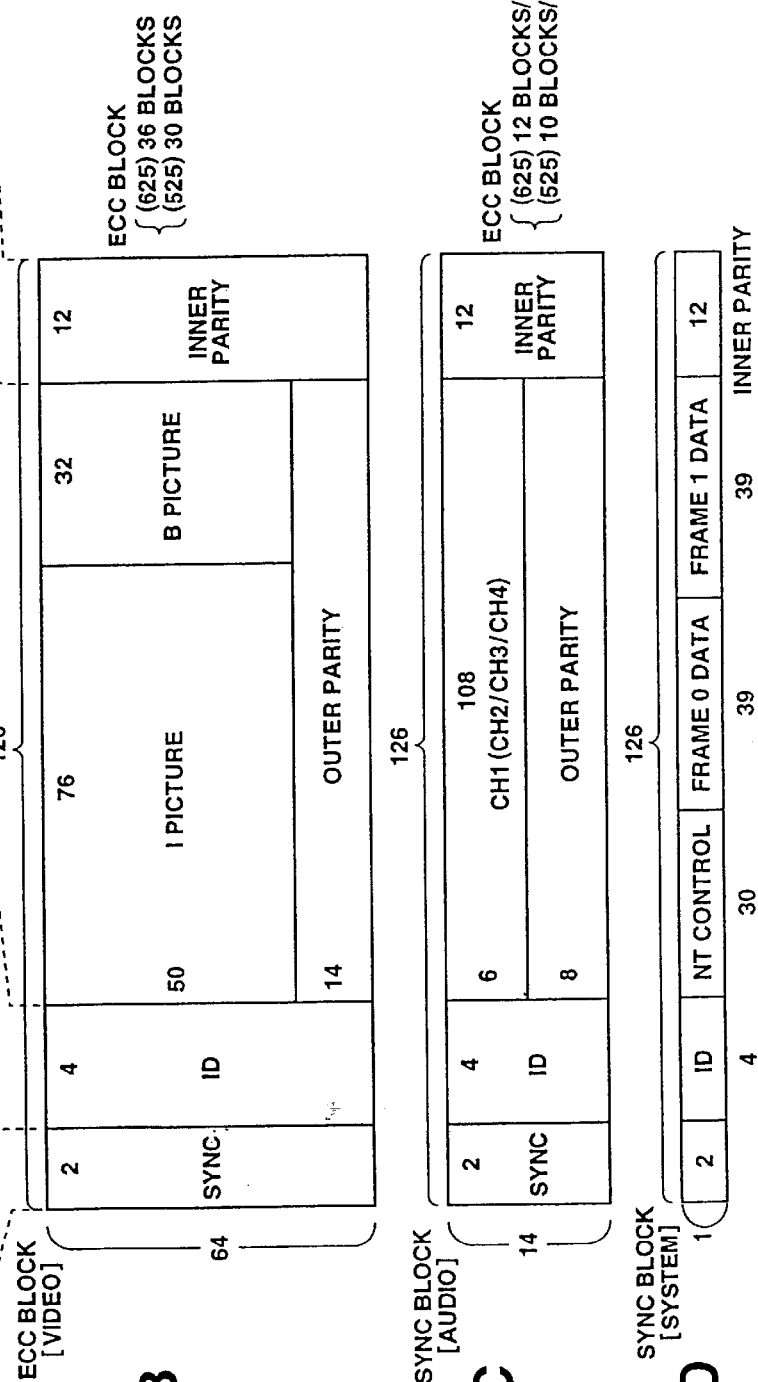
FIG.6A
FIG.6B
FIG.6C
FIG.6D

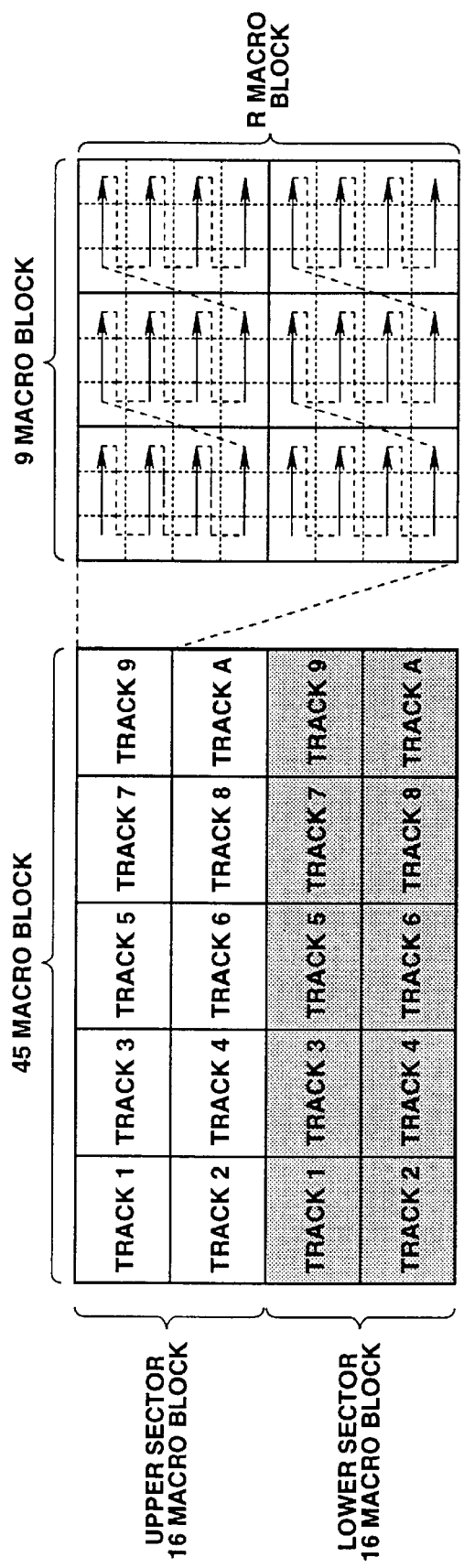

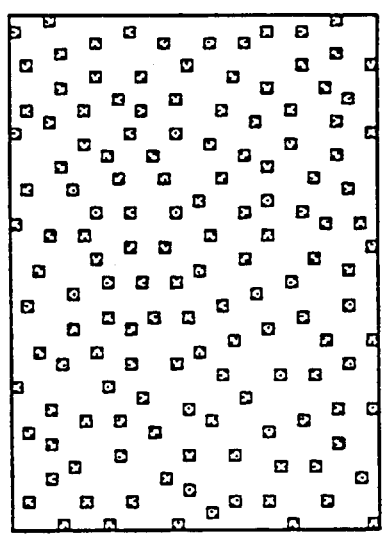
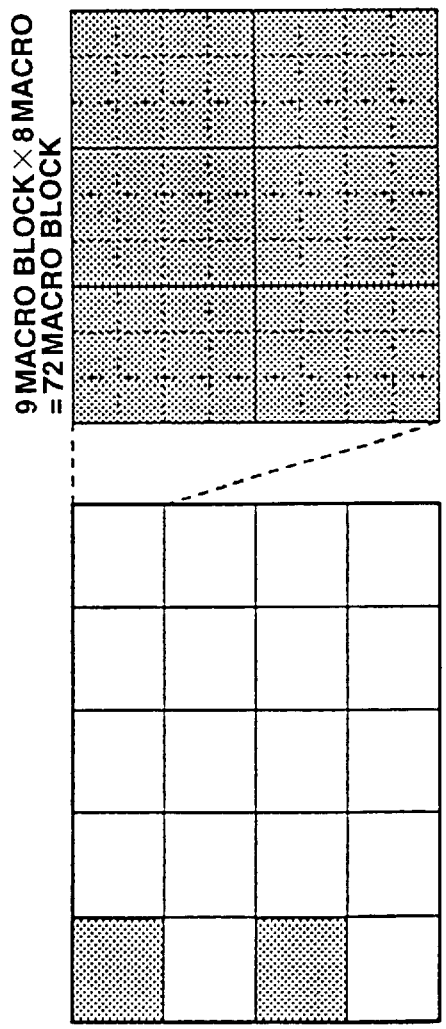
FIG.9C
FIG.9B
FIG.9A

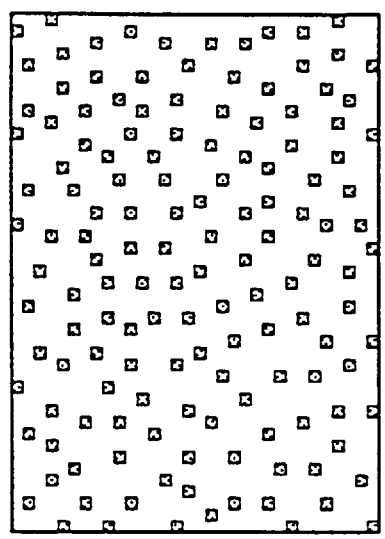
FIG.10C
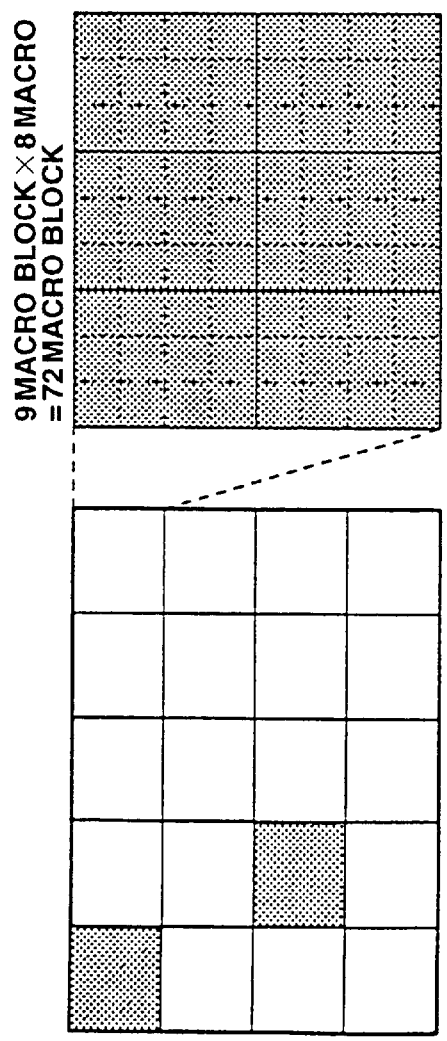
FIG.10B
FIG.10A

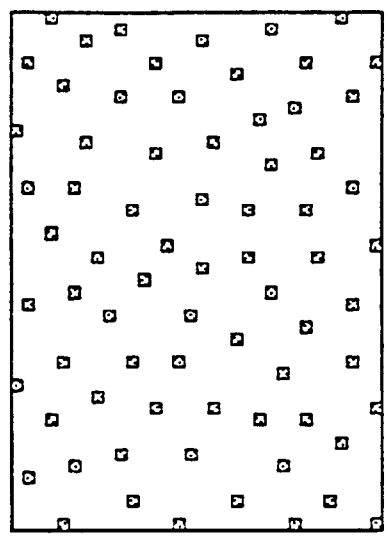
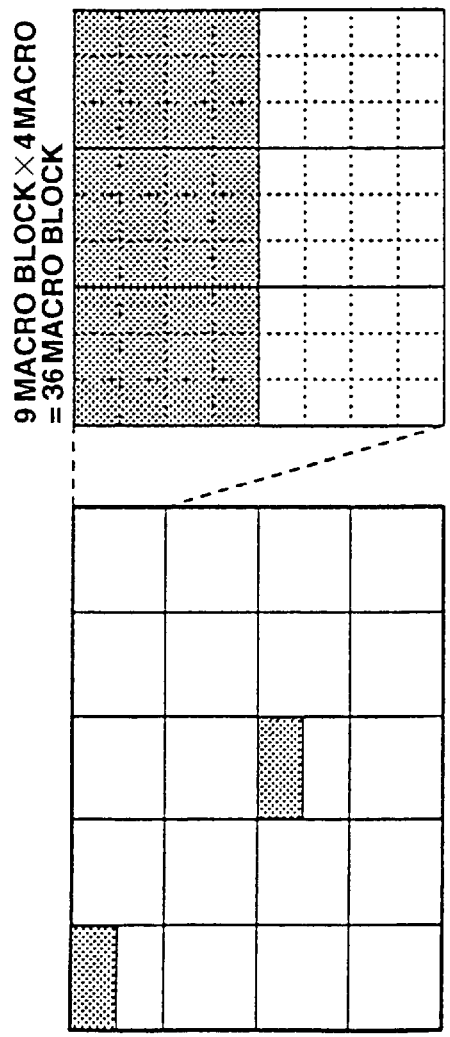
FIG.11C
FIG.11B
FIG.11A

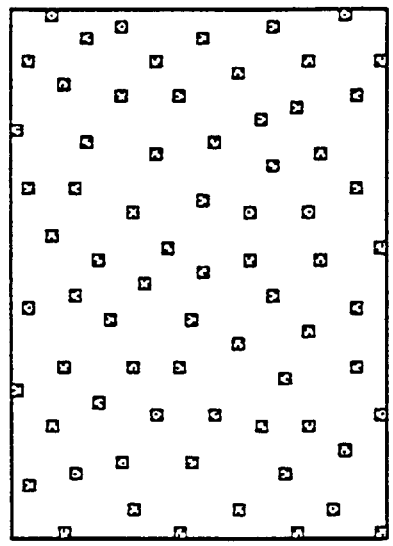
FIG.12C
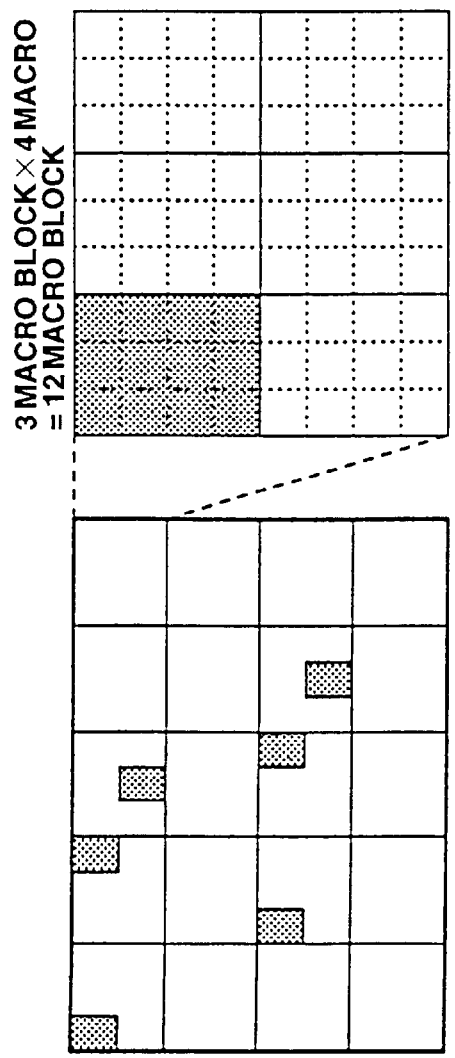
FIG.12B
FIG.12A

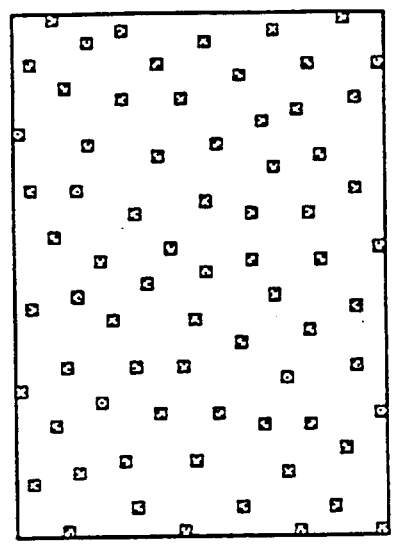
FIG.13C
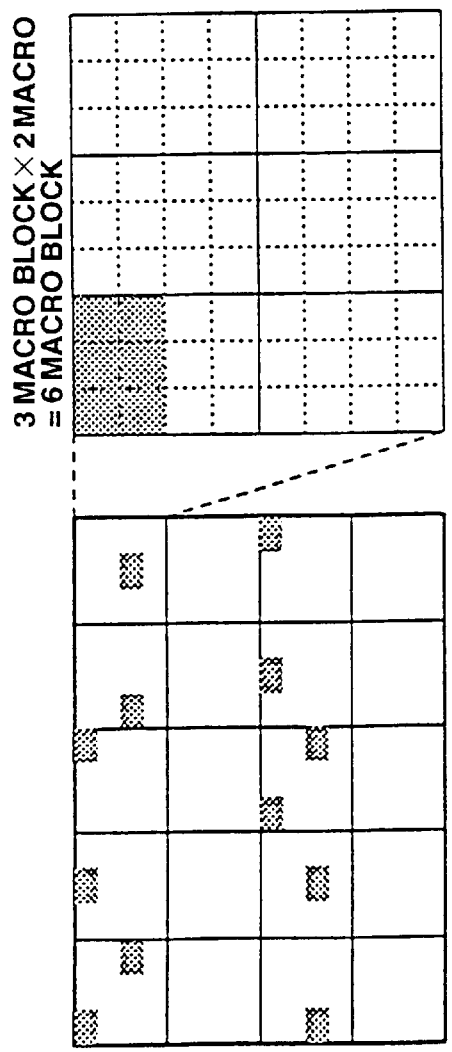
FIG.13B
FIG.13A

2 HEAD

4HEAD

8HEAD

16 HEAD

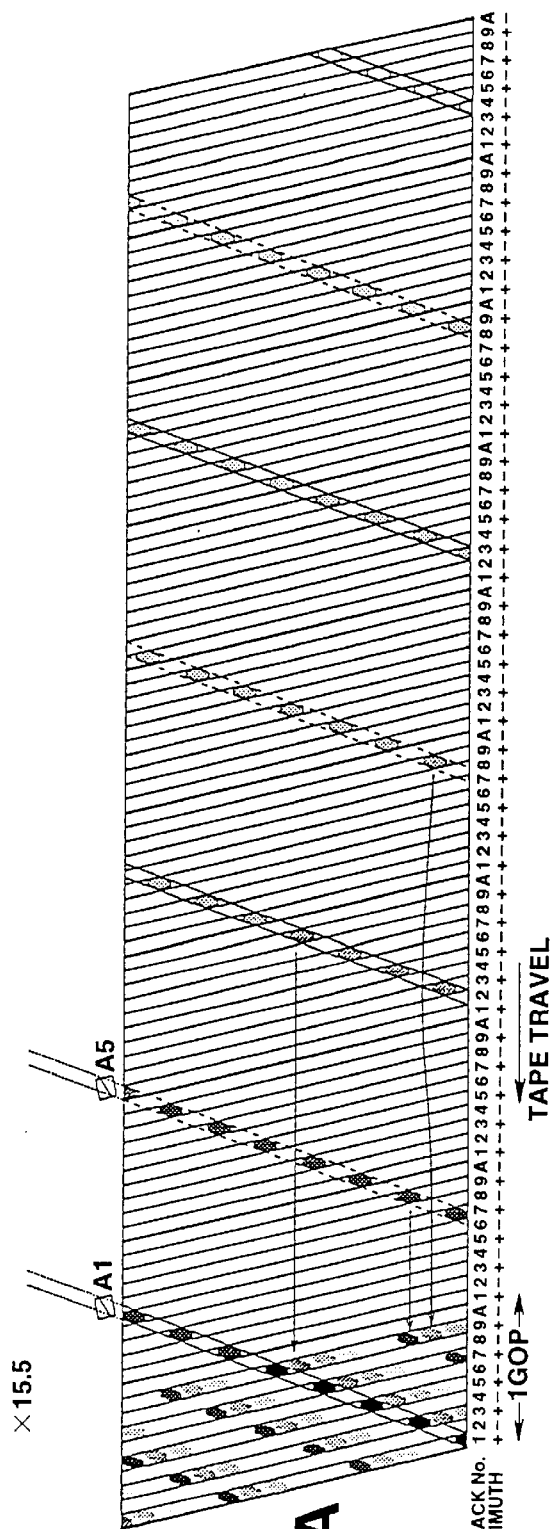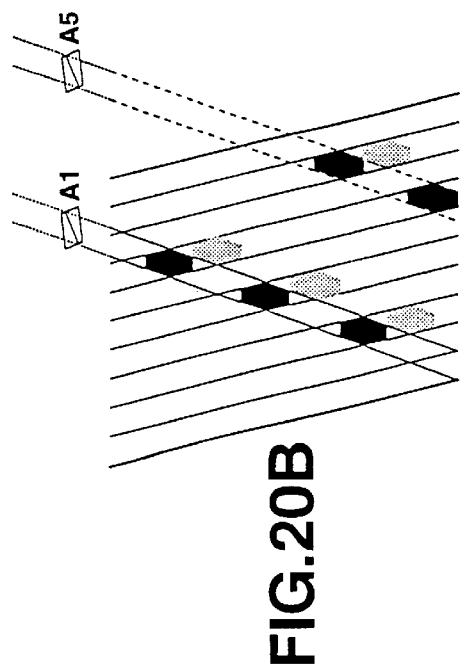
FIG.20A
FIG.20B

DATA REPRODUCING METHOD, REPRODUCING SPEED CONTROL APPARATUS AND REPRODUCING APPARATUS

BACKGROUND OF THE INVENTION

1. Field of the Invention

The present invention relates to technology to advance quality of an image (a search picture) that image data recorded on the magnetic tape is reproduced at high speed, particularly to a data reproducing method, a reproducing speed control apparatus and a reproducing apparatus that it is possible to reproduce more image data by using plural reproducing heads.

2. Description of the Prior Art

In a video tape recorder for recording and reproducing a television signal by using a magnetic tape, a digital video tape recorder (a digital VTR) is proposed as it is possible to record and reproduce without degrading substantially the television signal. Further, in case that the magnetic tape used for the digital VTR is stored into a cassette, it is also called a digital video cassette tape recorder (a digital VCR).

The digital VCR records a voice signal and an image signal including a control signal and so on into the magnetic tape as digital data and obtains the image signal by reproducing the digital data recorded on the magnetic tape.

An area on the magnetic tape on which the digital data of the image signal is recorded by the digital VCR is called a track. The track is generally an inclined recording track (a helical track) recorded and formed by scanning the magnetic tape by a recording heads installed on a rotating drum inclined to the longitudinal direction, that is, to the traveling direction of the magnetic tape.

The digital VCR is possible to control degradation of the signal to the minimum by using data error correcting technology because the image signal recorded to and reproduced from the magnetic tape is the digital signal. Therefore, it has a characteristic, that it is comparatively easy to edit the magnetic tape on which the image signal is recorded and to reproduce it by changing speed, different from a conventional analog VCR.

In the digital VCR (simply VCR below), when the image data (a moving picture) recorded on the magnetic tape is reproduced (search) at high speed faster than the original reproducing speed which is the same speed as the recording speed, the reproducing head scans over plural tracks. That is, any image data recorded on one track is not scanned and any image data necessary for reproducing one screen is not reproduced.

As a result, a search picture becomes rough comparing with the image reproduced at the original reproducing speed, includes noise, therefore, quality of the picture becomes inferior.

As above mentioned, a main cause of a deterioration of the quality of the search picture is that the image data reproduced from the magnetic tape by scanning once by the reproducing heads decreases as the reproducing speed becomes faster. Therefore, by increasing the number of the reproducing heads provided on the rotating drum, the image data is also reproduced as much as possible in reproducing the search picture and it is tried to advance the quality of the search picture.

Relation between disposing of the reproducing heads on the rotating drum and reproducing speed will be described referring to FIG. 14.

FIG. 14A shows configuration of reproducing heads at least necessary for reproducing image data at the original speed and an example of the configuration of two heads that a set of the reproducing heads A1 and B1 which azimuth angles are different each other is disposed.

Here, the azimuth angle is the angle that inclines a gap of the recording head for recording and forming each track on the opposite side of the direction of forming the track each other in order to prevent signals of the adjacent tracks on the magnetic tape from interference. Usually this azimuth angle is approximately from several to 10 degrees and it is possible to record at high density without providing a guard band and so on by setting properly this value.

In the VCR of the configuration of two heads having + and − azimuth, it is known that the reproducing speed (the search speed) S in reproducing the search picture may be set to satisfy the following an expression (1).

$$S=(T/2) \times n \pm 0.5 \text{ [Times Speed]} \tag{1}$$

(n is an integer and T is the number of helical tracks number for recording image data of one screen.)

Because the reproducing head of + azimuth angle is rushed into a first track of T tracks forming one screen by a first scanning by the drum, into a second track by a second scanning, into a third track by a third scanning . . . , therefore, the search speed of the traced track is changed one after another by every scanning of the drum, and the image data of adjacent frames about time is continuously reproduced.

Further, it is particularly effective for the VCR using the shuffling pattern to dispose the image data of Macro Blocks adjacent on the screen together on the magnetic tape in order to renew an area as large as possible on the screen by scanning once to choose the search speed to the double speed given by the expression (1). Such shuffling pattern is used in case of the large Macro Block (for example, 16 pixels×16 scanning lines) that is a fundamental unit in case of forming the screen by using the image compressing technology as below mentioned.

FIG. 14B shows an example of the configuration of 4 heads that another set of reproducing heads A5 and B5 that the azimuth angles are different each other is added to the configuration of two heads as shown in FIG. 14A at the opposite positions on the rotating drum.

When the search speed S shown by the expression (1) is chosen in the VCR of 4 heads configuration, the data on the track of the same track number reproduced by plural reproducing heads having the same azimuth angle each other at the speed of some times (for example, n=2, 4, . . . ) each other overlaps each other, therefore, it is impossible to make use of the reproducing heads increased for increasing amount of the image data that it is possible to reproduce by scanning once. It is also similarly in the VCR of 8 heads configuration as shown in FIGS. 14C and 16 heads configuration as shown in FIG. 14D.

However, it was vague that it was effectively possible to use the plural reproducing heads to the maximum when any speed except the search speed S satisfying the expression (1) was set.

As above mentioned, as relation between the configuration of the reproducing heads and the reproducing speed was not clear in the VCR that the plural reproducing heads were installed on the rotating drum, even if the plural reproducing heads had been installed, they did not always work effectively.

SUMMARY OF THE INVENTION

The present invention was achieved for solving the problem as above mentioned, and an object of the present invention is to provide an image data reproducing method which is possible to obtain a search picture with high quality, a reproducing speed control apparatus, and a recording/ reproducing apparatus by finding search speed that it is possible to reproduce image data as much as possible by using the most effectively plural reproducing heads in reproducing a search picture and by setting to the speed.

A data reproducing method according to the present invention proposed for solving the problem as above mentioned is the data reproducing method that plural sets of reproducing heads disposed on a rotating drum reproduce data recorded on a magnetic tape at the speed faster than the fixed original reproducing speed, and is characterized by including a first step for setting traveling speed of the magnetic tape so that traces on the magnetic tape of the reproducing heads each other do not overlap fit for the number of sets of the plural reproducing heads, and a second step for traveling the magnetic tape at the traveling speed set by the first step and for reproducing the data recorded on the magnetic tape.

Further, a reproducing speed control apparatus according to the present invention is the reproducing speed control apparatus that plural sets of reproducing heads disposed on a rotating drum control to reproduce data recorded on a magnetic tape at the speed faster than the fixed original speed, the data reproducing method, and is characterized by including a setting means for setting traveling speed of the magnetic tape so that traces on the magnetic tape of the reproducing heads each other do not overlap fit for the number of sets of the plural reproducing heads, and a reproducing control means for traveling the magnetic tape at the traveling speed set by the setting means and for reproducing the data recorded on the magnetic tape.

A reproducing apparatus according to the present invention is the reproducing apparatus for which the image data reproducing method and the reproducing speed control apparatus as above mentioned are applied and that plural sets of reproducing heads disposed on a rotating drum reproduce data recorded on a magnetic tape at the speed faster than the fixed original speed, and is characterized by including a traveling speed setting means for setting traveling speed of the magnetic tape so that traces on the magnetic tape of the reproducing heads each other do not overlap fit for the number of sets of the plural reproducing heads, a tape traveling means for traveling the magnetic tape at the traveling speed set by the traveling speed setting means, and a reproducing means for reproducing the magnetic tape traveled by the tape traveling means.

According to the data reproducing method, the reproducing speed control apparatus and the reproducing apparatus relating to the present invention, the plural reproducing heads can choose the reproducing speed to reproduce the data of different areas on the screen respectively in case of reproducing the image data to the search picture by using the plural reproducing heads, therefore, it is possible to advance the quality of the search picture comparing with the prior art.

BRIEF DESCRIPTION OF THE DRAWINGS

FIGS. 6A, 6B, 6C, 6D are specific explanatory view of configuration of compressed and encoded data.

FIGS. 7A, 7B are explanatory view of a shuffling pattern.

FIGS. 9A, 9B, 9C are explanatory view of the situation that Macro Blocks are renewed in reproducing at double speed.

FIGS. 10A, 10B, 10C are is an explanatory view of the situation that Macro Blocks are renewed in reproducing at speed of 4 times.

FIGS. 11A, 11B, 11C are explanatory view of the situation that Macro Blocks are renewed in reproducing at speed of 7 times.

FIGS. 12A, 12B, 12C are explanatory view of the situation that Macro Blocks are renewed in reproducing at speed of 19 times.

FIGS. 13A, 13B, 13C are explanatory view of the situation that Macro Blocks are renewed in reproducing at speed of 37 times.

FIGS. 20A, 20B are explanatory view of head tracing in case of reproducing data of a NTSC method at speed of 15.5 times by 4 heads configuration.

DETAILED DESCRIPTION OF THE PREFERRED EMBODIMENT

The preferred embodiments of a data reproducing method, a reproducing speed control apparatus and a reproducing apparatus according to the present invention will be described. First a recording/reproducing apparatus to which the data reproducing method, the reproducing speed control apparatus and the reproducing apparatus are applied will be described, and second the data processing method and the reproducing speed control apparatus will be substantially described referring to the structure and the operation of the recording/reproducing apparatus.

Figure 1:
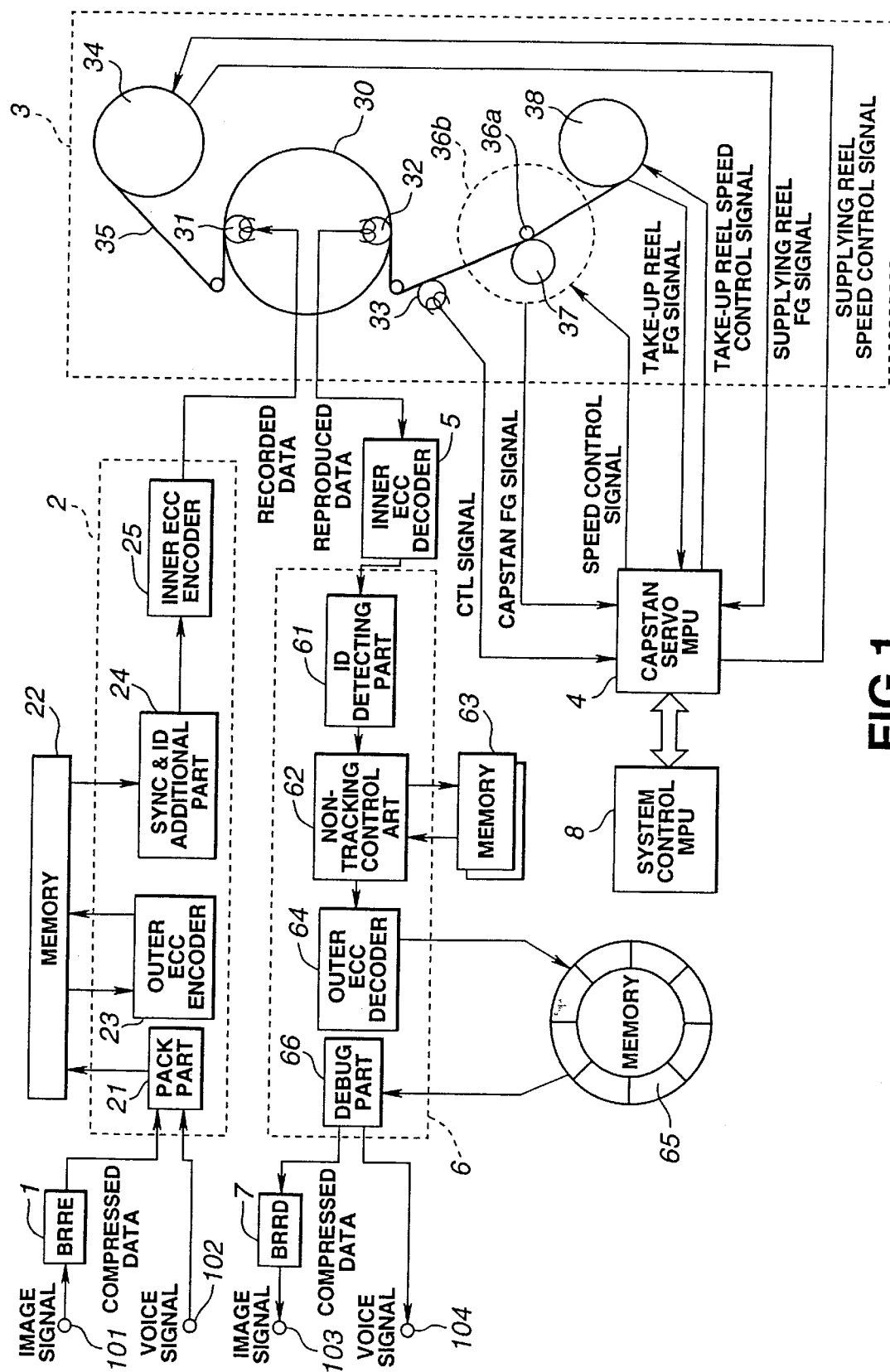
FIG. 1 is a block diagram showing the configuration of a main part of a digital VCR according to the present invention.

FIG. 1 is a block diagram showing an example of the structure of the main part of digital VCR which is the recording reproducing apparatus to which the data reproducing method, the reproducing speed control apparatus and the reproducing apparatus are applied according to the present invention are applied.

The VCR compresses a digital image signal by using image compression and encodes technology, and records it on a magnetic tape. Further, it decodes, expands and reproduces the compressed image data recorded on the magnetic tape.

The image signal inputted from an image input terminal 101 is compressed by the BRRE (a bit rate reduction encoder) 1. This compression encoding method is the method for generating a encoding data line by executing orthogonal transforming encoding such as DCT (Discrete Cosine Transform), prediction encoding, quantizing and variable length coding as a frame (Group of Picture; GOP) of the fixed number is a unit similarly to a digital moving picture (compression) encoding method such as the MPEG (Moving Picture Experts Group). As the compression encoding method, the compression method using the compression in the frame and so on and other compression method as well as the compression method such as the MPEG using correlation between the frames may be also used. The compressed image data is executed error correcting encoding by the ECC encoder part 2 and is recorded on the magnetic tape at a tape running system 3. The compressed image data recorded on the magnetic tape is executed error correcting decoding by an inner ECC decoder 5 and an outer ECC decoder part 6, is expanded by the BRRD (Bit Rate Reaction Decoder) 7 and is outputted from an image output terminal 103.

First, the function of each part of the recording system of the VCR will be described along the flow of the image data.

In the present embodiment, the BRRE 1 encodes the part (the Macro Block) formed by 16 pixels×16 scanning lines of the image signal forming a screen inputted from the image input terminal 101 as a unit.

Figure 2:
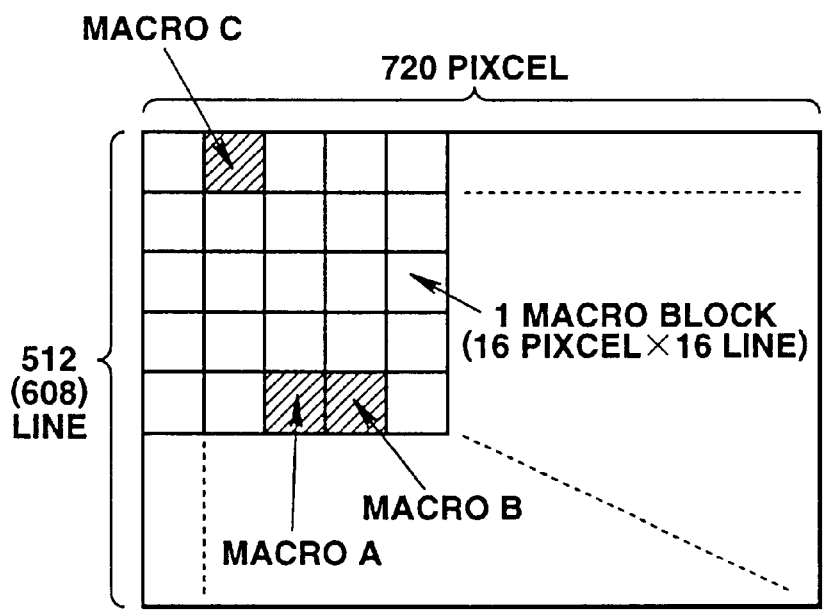
FIG. 2 is an explanatory view of Macro Blocks forming a screen.

Substantially, as shown in FIG. 2, in the NTSC method, a screen formed by 720 pixels in the direction of the scanning lines and the number of the scanning lines of 525 (the effective number of scanning lines of 512) in the vertical direction/field frequency of 60 Hz is divided into the Macro Blocks of 16 pixels×16 lines. As a result, a screen is divided into 1440 Macro Blocks including 45 Macro Blocks in the scanning direction and 32 Macro Blocks in the vertical lines.

Further, in the PAL method, a screen formed by 720 pixels in the direction of the scanning lines and the number of the scanning lines of 625 (the effective number of scanning lines of 608) in the vertical direction/field frequency of 50 Hz is divided into the similar Macro Blocks. As a result, a screen is divided into 1710 Macro Blocks including 45 Macro Blocks in the scanning direction and 38 Macro Blocks in the vertical lines.

Figure 3A:
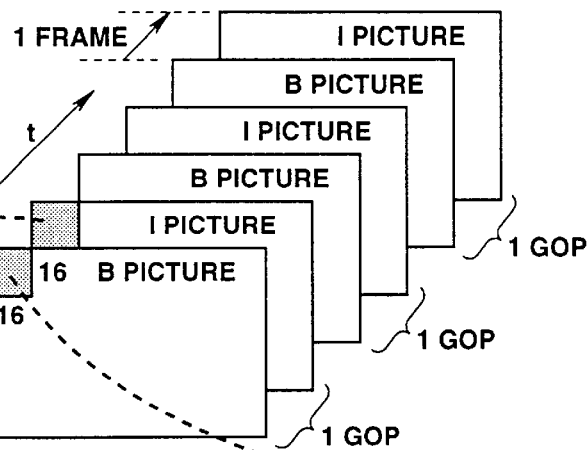
FIGS. 3A, 3B, 3C are explanatory view of configuration of compressed and encoded image data.
Figure 3B:
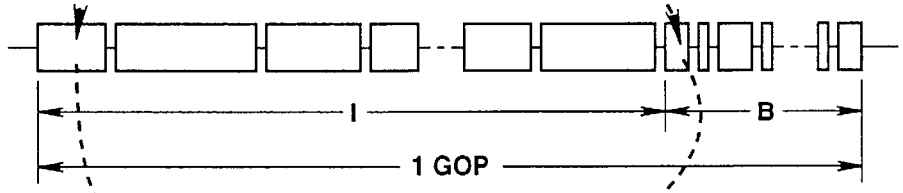

As the divided Macro Block is a unit, the image data is compressed and encoded, is executed shuffling processing and so on as below mentioned and recorded on the magnetic tape. When compressing this image data (the moving picture), as shown in FIG. 3A, the I Picture (the Intra-Picture) that encoding in the frame is executed in the same order as the original data every one frame of the screen and the B Picture (the Bidirectionally Predictive-Picture) that predictive encoding is executed in the future and the past direction from the front and the back I Picture of it is executed are generated. The image data of two frames including the I and the B Picture is generated in order of time t as a GOP (the Group of Picture).

In the image data of each GOP which is compressed and encoded, as shown in FIG. 3A, first the I Picture which completes as the image data only itself is outputted and the B Picture that it takes processing time is continuously outputted. The image data of two frames including the I and the B Picture is a GOP and is inputted into a pack part 21 of the ECC (Error Correction Code) encoder part 2.

Figure 3C:
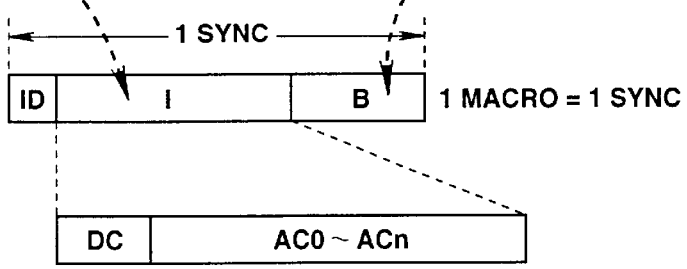

The pack part 21 apportions the encoding image data which is the variable length coding data compressed every GOP by the BRRE 1 and the voice data which is the code of the fixed length inputted from a voice input terminal 102 to a recording block of the fixed length (the SYNC block) and packs as shown in FIG. 3C.

Figure 4:
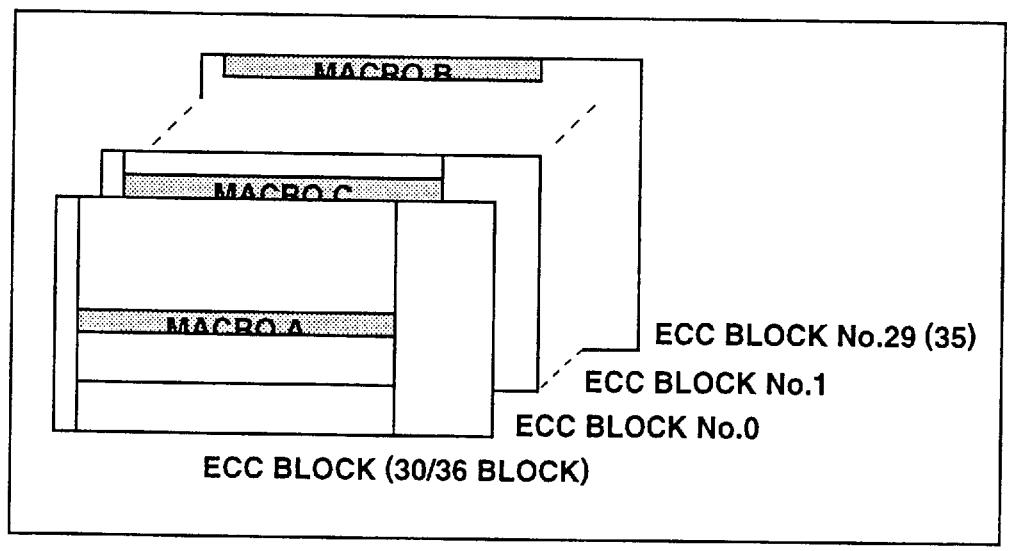
FIG. 4 is an explanatory view of configuration of compressed and encoded image data.

The pack part 21 extracts the Macro Block number added to the variable length coding data line of the inputted image and stores the recording block which is packed at the fixed length into a memory 22 according to the shuffling pattern as below mentioned. Substantially, the pack part 21 generates a write address showing the fixed address of the memory 22 and is actually stored into the memory 22 according to the address so that the recording block is recorded to the fixed place of the ECC block as shown in FIG. 4 according to the shuffling pattern. Though the concrete contents of the ECC Block will be described below, as shown in FIG. 4, there are the ECC Blocks of 1 GOP 30 Blocks in case of the NTSC signal and of 1 GOP 36 Blocks in case of the PAL signal. Here, the Macro Block number means information showing the Macro Block at which position on the screen there is as shown in FIG. 2.

The outer ECC encoder 23 adds the outer parity to the image/voice data stored into the memory 22 as the data of the ECC Block according to each shuffling pattern of the image and the voice data.

Substantially, the outer ECC encoder 23 accesses the image/voice data stored into the memory 22, generates each outer parity of the image and the voice to the accessed data, and stores into the memory 22 with the image/voice data according to the form of the ECC Block as shown in FIG. 6 again. The forms of the ECC Blocks as shown in FIGS. 6A, 6B, 6C and 6D will be described below.

The SYNC & ID additional part 24 generates the ID in order of recording the image/voice data on the magnetic tape and generates the lead address of the memory 22 comparing to the track interleave pattern as below mentioned.

Further, the SYNC & ID additional part 24 adds the ID 4 bytes as the identifying data of each SYNC Block and the SYNC 2 bytes of the fixed pattern as the synchronous data to the head of the image/voice data block 108 bytes read from the memory 22 according to the lead address and outputs to the inner ECC encoder 25.

The inner ECC encoder 25, as substantially shown in FIG. 6, generates and adds the inner parity of 12 bytes to 114 bytes in all including each of the image/voice data of 108 bytes from the SYNC & ID additional part 24, the system data (not shown) recorded in the recording area of the audio data, the ID of 4 bytes and the SYNC of 2 bytes, and supplies to the recording head 31 of the tape running system 3 for recording on the magnetic tape.

Figure 5:
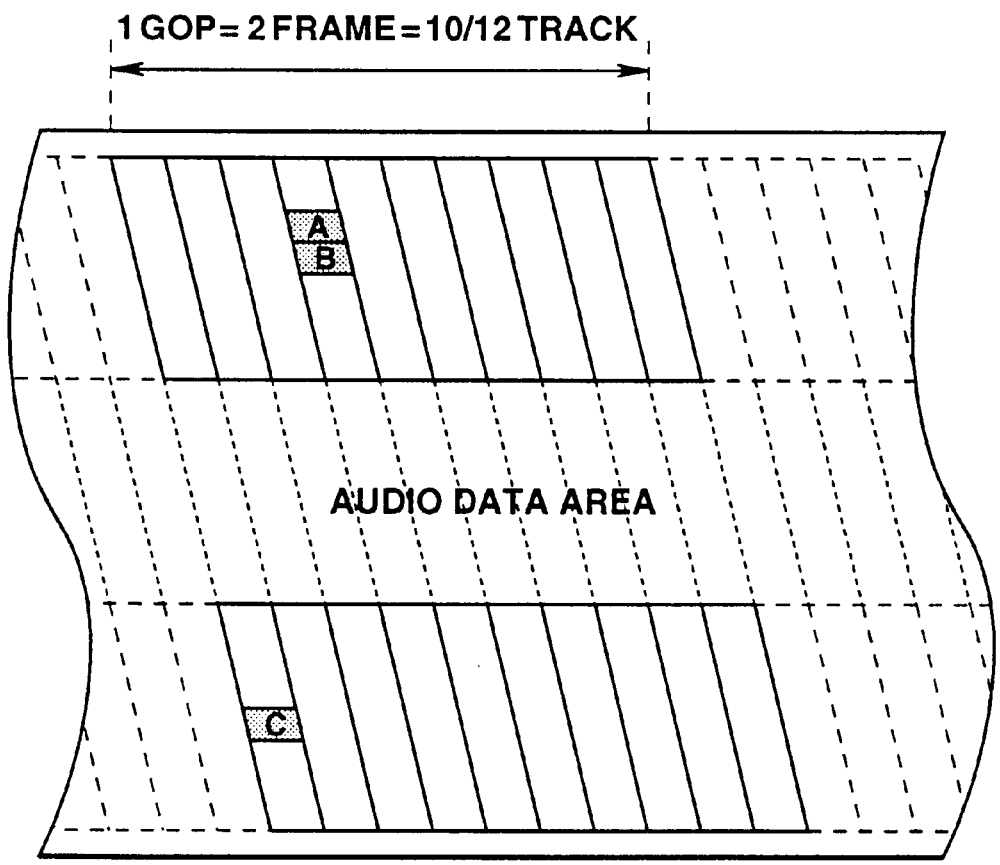
FIG. 5 is an explanatory view of areas on a magnetic tape on which data is recorded.

The image and the voice signal respectively inputted from the image input terminal 101 and the voice input terminal 102 by the signal processing as above mentioned are recorded in the fixed areas on the tape shown in FIG. 5. That is, the compressed image signal is divided into two areas (the two areas including the Upper and the Lower Sector) and recorded and the voice signal is recorded in the Audio Data Area to be put between these two areas.

The positions on the tape of the Macro Blocks A, B and C (Macro A, Macro B and Macro C) (in FIG. 4) included in the ECC Blocks for the image signal are, for example, the positions A, B and C in FIG. 5 respectively.

In the screen as shown in FIG. 2, the Macro Block A is adjacent to the Macro Block B, however, the Macro Block C is apart from the Macro Blocks A and B. Therefore, as shown in FIG. 5, the Macro Blocks A and B are recorded at the positions which are adjacent on the tape, and the Macro Block C is recorded at the position apart from the Macro Blocks A and B.

Here, the ECC Blocks as above mentioned will be described.

FIG. 6 is a view showing the structure of the unit of the recording block as shown in FIG. 3C.

FIG. 6A substantially shows the structure of the SYNC Block which is the recording block of the fixed length as above mentioned. That is, the SYNC Block is constructed by 126 bytes including the SYNC of 2 bytes, the ID of 4 bytes, the data of 108 bytes and the inner parity of 12 bytes. As above mentioned, the ID of 4 bytes and the SYNC of 2 bytes are added to the image/voice data 108 bytes read from the memory 22 by the SYNC & ID adding part 24, the inner parity 12 bytes are added by the inner ECC encoder 25, therefore, the SYNC Block which is the recording block of the fixed length shown in FIG. 6A is constructed. Though the image signal inputted from the image input terminal 101 is inputted into the pack part 21 as the variable length coding compression data through the BRRE 1 as above mentioned, since the variable length coding compression data is packed at the fixed length at the pack part 21 and is stored into the memory 22, the length of the data of the SYNC Block is fixed.

As above mentioned, it is stored again into the memory 22 to access to the image/voice data of the fixed length stored into the memory 22 by the outer ECC encoder 23, to generate the outer parity of the image/voice data and to construct one ECC Block as shown in FIG. 6B. The ECC Block, as shown in FIG. 6B, is formed by 64 recording Blocks, one Block including 50 SYNC Blocks as shown in FIGS. 6A and 14 outer parities added through the outer ECC encoder. In case that the compression image data is constructed by 625/50 (the PAL method), the image data of 1 GOP is accommodated into 36 ECC Blocks, and in case that the compression image data is constructed by 525/60 (the NTSC method), the image data of 1 GOP is accommodated into the 30 ECC Blocks.

Further, as shown in FIG. 6C, one ECC Block consists of 14 Recording Blocks for the non-compression voice data including the non-compression voice data corresponding to the image data of 1 GOP. In one ECC Block, one Recording Block includes the non-compression voice data of 108 bytes, the SYNC as the synchronous data of 2 bytes, the ID 4 bytes for identifying each recording block and the inner parity of 12 bytes, and one ECC Block consists of 6 Recording Blocks and the Recording Blocks including 8 outer parities.

In case that the compression image data is formed by 625/50 (the PAL method), the voice data of 1 GOP is accommodated into 12 ECC Blocks, and in case that the compression image data is formed by 525/60 structure (the NTSC method), the voice data of 1 GOP is accommodated into 10 ECC Blocks. In the present embodiment, 1 GOP includes the voice data of the maximum 4 channels (CH1, CH2, CH3 and CH4). Further, the length of the non-compression voice data is fixed and the pack part 21 divides equally the inputted non-compression voice data into the fixed length and accommodates into each recording blocks.

Further, the system SYNC Block as shown in FIG. 6D is generated by a control part or user interface and so on (not shown). The system SYNC Block, as shown in FIG. 6D, is not in product codes such as the image voice data, instead, the 32 SYNC Blocks of the same system in case of 625/50 structure (the PAL method) and the 20 SYNC Blocks of the same system in case of 525/60 structure (the NYSC method) are repeatedly written into the recording area on the tape of 1 GOP. The structure of the system SYNC Block as shown in FIG. 6D, similarly to the ECC Block of the image voice data, includes from the head the synchronous data Sync of 2 bytes, the ID 4 bytes for identifying the blocks, after that, a non-tracking control data (NT Control) of 30 bytes used for a non-tracking processing at a non-tracking control part 52 in the ECC encoder 6 of the reproducing system, and two Flames (Flame 0 Data and Flame 1 Data) of the control data of 39 bytes used when a user controls the tape and so on.

The generated system SYNC Block as shown in FIG. 6D is stored into the memory 22 similarly to the ECC Block for the image and the voice by the pack part 21.

Next the packing method when the pack part 21 packs the inputted compression image data and non-compression voice data to the SYNC Blocks of the fixed length will be described. As above mentioned, the variable length coding image data compressed every GOP and the non-compression voice data are packed by apportioning to the SYNC Block unit of the fixed length by the pack part 21. Then, as the image data is the variable length coding data, it is the fixed amount of data at 1 GOP unit, however, there are the Macro Blocks that amount of data is large and that the amount of data is small at the Macro Block unit. That is, as the Macro Block that the amount of data is large might be accommodated into one SYNC Block, it is necessary to accommodate it into the gap of the area of the SYNC Block of the Macro Block that the amount of the data is small.

Therefore, as shown in FIG. 3C, the component of the direct current (DC) of the data of the Macro Block is recorded at the head of the SYNC Block and accommodated from the lowest frequency of the compression image data of each Macro Block sequentially.

Thus, if the components of the compression image data are accommodated from the lowest frequency into the data area (DATA) sequentially and is recorded on the tape, the DC and the low frequency component important as the image are surely included in the SYNC Block reproduced at the reproducing head when reproducing the search picture so long as the data error does not occur at the head of the data area of the unit of the recording block, therefore, it is possible to update (reproduce) the component of the direct current of the compression image data which is the most effective to the quality of the worst reproducing image. That is, if it is possible to reproduce 1 SYNC Block, it is possible to reproduce 1 Macro Block and to advance the quality of the picture of reproducing of the search picture.

Therefore, it is possible to prevent situation that it is not possible to reproduce the image of the Macro Block that the data error occurs at all by accommodating the compression image data into the unit of the recording block and to control degradation of the quality of the reproduced image to the minimum.

Next, a tape traveling system 3 of the VCR will be described by using FIG. 1. Here a magnetic tape 35 received into a cassette (not shown) has already installed in the tape traveling system 3 of the VCR and has been under the recordable/reproducible condition.

The recorded data supplied from an inner ECC encoder 25 is recorded by forming a helical track on the magnetic tape 35 by the magnetic head 31 disposed on a rotating drum 30. Further, the control (CTL) signal which is criterion of the tape traveling system is also recorded in the longitudinal direction of the magnetic tape by a control signal recording/reproducing head (CTL head) 33 as well as the recorded data.

In reproducing, the CTL head 33 reproduces the CTL signal recorded on the magnetic tape and inputs into a capstan servo MPU 4. Further, a capstan FG signal showing rotating speed of the capstan supplied by a capstan FG (a frequency generator) 36b installed to a motor which rotates and drives a capstan 36a, and a S and a T reel FG signal showing each rotating speed of a reel 34 on the side of supplying and a reel 38 on the side of taking up respectively are inputted into the capstan servo MPU 4.

The capstan servo MPU 4 controls the rotating speed of the motor which drives the capstan 36 to the same reproducing speed as that in recording in reproducing usually and to the desired reproducing speed in reproducing a search picture corresponding to the inputted CTL and FG signal according to the tape traveling mode directed by the system control MPU 8 which executes the system control at the upper degree of the VCR. Further it also controls the rotating speed of the reel 34 on the side of supplying and the reel 38 on the side of taking up the tape and keeps properly tension of the tape.

Further, though the capstan mainly controls the speed of the tape by applying a pinch roller 37 to the capstan 36 in reproducing up to about ten times as speedy, it is preferred to control the speed of the tape by two reel motors on the side of supplying and taking up the tape without applying the pinch roller 37 to the capstan 36 in reproducing the search picture at higher speed.

Controlling of the search speed fit for reproducing the search picture by using plural reproducing heads in the tape traveling system 3 will be specifically described below.

Next, a function of each part on the side of reproducing the VCR will be described along flow of the data.

The reproducing head 32 disposed on the rotating drum 30 reproduces the data from the magnetic tape relatively traveling and supplies to the inner ECC decoder 5.

The inner ECC decoder 5 corrects an error of every SYNC Block which is the recording block of the fixed length that the image and the voice data compressed every GOP are packed, and outputs the data after correcting to an ID detecting part 61 with the error flag showing the error when there is the error which has not been corrected.

The ID detecting part 61 judges the ID of every GOP which is the reference of the unit of the data in non-tracking as below mentioned about the data that the inner error has been corrected and transmits to the non-tracking control part 62.

The non-tracking control part 62 refers the ID of the SYNC Block reproduced one after another to the ID which is the reference of every GOP judged by the ID detecting part 61 and controls so that the SYNC Blocks with the same ID as that of the reference are collected into the memory 63 as the group of the same GOP. Thus, the correct data of every GOP is collected and the ECC Block is formed. Then, the track ID and the SYNC Block ID are referred to the track interleaving pattern and the write address of the memory 63 is generated.

The non-tracking control part 62 judges that the data of 1 GOP is newly renewed and reads out the data from the memory 63. Then the data is sorted in the outer direction and is outputted to the outer ECC decoder 64.

Further, the non-tracking control part 62 executes non-tracking control processing by using the non-tracking control data (NT Control) received into the system SYNC Block as above mentioned. That is, the non-tracking control part 62 chooses the voice/image data that the data error rate detected by the inner ECC decoder 5 is the lowest and outputs to the memory 63.

Here, the non-tracking control processing will be described.

The voice/image data is recorded on the magnetic tape 35 by inverting the azimuth angle of the adjacent helical track alternatively. When the azimuth angle of every helical track is alternatively inverted as above mentioned, even if the azimuth angle of the reproducing head 32 traces the different helical track, it is impossible to reproduce the voice/image data recorded on the magnetic tape 35.

When the reproducing head 32 does not correctly the helical track even if the reproducing head 32 traces the helical track of the same azimuth angle, a lot of errors occurs in the voice/image data.

Characteristics relating to the reproducing head in reproducing the voice/image data and the azimuth angle of the helical track are used for the non-tracking control processing. That is, the reproducing head 32 has two positive azimuth heads and two negative azimuth heads (the structure of the reproducing head will be described below by using FIG. 15) at the interval of one helical track, the helical track and the azimuth angle of these four reproducing heads are agreed, and the voice/image data read out by the reproducing head which traces correctly the helical track, that is, the voice/image data that the error rate is the lowest is chosen and outputted. As above mentioned, the tracking control of the reproducing head to the helical track of the VCR according to the present embodiment is largely relaxed by adopting the non-tracking method.

The outer ECC decoder 64 executes error correction (mainly eraser correction) by the outer parity by using the error flag added by the inner ECC decoder 5 and stores the data after correcting into the memory 65.

A debug part 66 generates the lead address of the memory 65 for reading out the SYNC Block in which the Macro Block which should be outputted is stored comparing to the shuffling pattern as below mentioned for outputting the data in order of the number of the Macro Block.

Further, debug part 66 executes the inverse processing to the processing which converts the compressed variable length coding data to the SYNC Block which is the data of the fixed length which is executed by the pack part 21. That is, it converts from the SYNC Block to the compressed variable length coding data and transmits the compressed image data to the BRRD (the bit rate reduction decoder) 7.

Then, as the voice data is not the variable length coding data, it is outputted by connecting the voice data of every SYNC Block. Further, the data set by the user which is stored as the system data is also outputted from the debug part 66.

The BRRD 7 decodes and expands the variable length coding compressed reproducing image data and outputs as the usual image signal through an image output terminal 103.

Next, the shuffling pattern which is the characteristic of the image data recording method applied to the VCR will be described.

As above mentioned, the pack part 21 reads out the shuffling pattern stored into the memory (ROM) which is not shown in the pack 21, and generates the reading out address of the memory 22 in which the recording block unit of the ECC Block corresponding to the identifying data ID is stored.

The memory 22 outputs the ECC Block which is the recording block unit stored into the reading out address to the SYNC & ID additional part 24.

The SYNC & ID additional part 24 divides the inputted recording block unit (the ECC Block) on the magnetic tape 35 corresponding to the helical track, executes the interleave and the track alternating processing and outputs to the inner ECC encoder 25.

That is, the recording block is assigned to the helical track on the actual magnetic tape 35 by the shuffling processing by the pack part 21 and the interleave and the track alternating processing by the SYNC & ID additional part 24.

First, the shuffling pattern processing of the pack part 21 as above mentioned will be described.

In the VCR apparatus for recording the image data which is not compressed on the magnetic tape, the shuffling processing is executed every comparatively small Macro Block of 1 pixel×1 line or 8 pixels×4 lines by the compression encoding method in the field.

In case of shuffling every pixel or every comparatively small Macro Block, the shuffling pattern is decided so that the pixels or the Macro Blocks which are adjacent in the same image are recorded at the positions which are as apart as possible on the tape for advancing error correcting ability. To record at separated positions is for dealing with the error caused by a burst flaw on the magnetic tape and dust and so on in the head, and is because it is possible to prevent the continuous data from lacking when reproducing the adjacent pixels or the comparatively small Macro Block. Further, as the area on the screen of the unit of the shuffling processing is small even if shuffling is executed by the shuffling pattern as above mentioned, the screen is seen as if it is integrated due to manes characteristic of the sense of sight even if a part of the image data is reproduced at high speed, therefore, it is possible for the user to recognize sufficiently the contents of the image.

However, in the shuffling pattern which records the comparatively large Macro Block of 16 pixels×16 lines at the position as apart as possible on the magnetic tape 35, an interval of the reproducing time of adjacent Macro Blocks on the image. Therefore there is no correlation of the adjacent Micro Blocks on the image, the boundary of the Macro Blocks is clearly recognized by the user, and the screen does not look like being integrated. As a result, the image looks like a "checker flag" that the image is divided by every Macro Block, and the search picture is very hard to see.

In order to solve the problems as above mentioned, in the VCR apparatus relating to the present invention, the adjacent Macro Blocks on the same image are recorded at the adjacent positions on the magnetic tape 35 so that it is possible to record the image data of the wide area of the same image every time when the recording head 31 scans the magnetic tape 35 once, and the adjacent Macro Blocks on the magnetic tape 35 are included in the different ECC Blocks respectively so that these Macro Blocks are corrected by the different error correcting codes (the inner and the outer parity) respectively.

For example, in the Macro Blocks A, B and C (the Macro A, the Macro B and the Macro C) including 16 pixels×16 lines in FIG. 2, when the Macro C is apart from the Macro A and B though the Macro A and B are adjacent each other, the Macro A and B are in the different ECC Block though the Macro A and B are adjacent each other as shown in FIG. 4 and they are recorded to be adjacent each other on the magnetic tape 35 as shown in FIG. 5.

According to the shuffling pattern, a part of the screen is renewed to a rectangle by scanning the reproducing head 32 once, to the large rectangle when the reproducing speed is low and to the smaller rectangle as it becomes higher.

The case of the 525/60 method (the NTSC method) about the shuffling pattern will be described in detail by using FIG. 7.

FIG. 7 is a view showing a method for dividing Macro Blocks.

As shown in FIG. 7A, when the image data is divided into the Macro Blocks of 16 pixels×16 lines, 45 Macro Blocks are created in the direction of the scanning line (in the horizontal direction), 32 Macro Blocks are created in the vertical direction (the total is 45×32.). The Macro Blocks of 45×32 are divided into 5 in the horizontal direction and 4 in the vertical direction.

As shown in FIG. 7A, 10 Blocks positioned at the upper side on the screen of the divided 20 Blocks are assigned to the area on the upper side (the Upper Sector in FIG. 8) of the helical track of the magnetic tape 35 and 10 Blocks on the lower side (netted parts in FIG. 7A) are assigned to the lower area (the Lower Sector in FIG. 8) of the helical track.

Further, as shown in FIG. 7B, the divided Block is divided into 3 parts in the horizontal direction and 2 parts in the vertical direction, and furthermore, the divided Block is divided into 12 units of 3 parts in the horizontal direction and 4 parts in the vertical direction respectively. The obtained 12 units are the shuffling units, as shown in FIG. 7B, the Macro Block is shuffled in order shown by arrows and dotted lines. When the reproducing head 32 scans the track from the bottom to the top once by shuffling, the data is renewed in order of the arrow in FIG. 7B on the screen.

Though the specific description of the shuffling pattern as above mentioned is in case of the 525/60 method (the NTSC method), it is possible use the shuffling pattern as shown in FIG. 7 as above mentioned in case of the 625/50 method (the PAL method).

Next, the track interleave processing will be described.

As above mentioned, the track interleave processing is executed to the inputted voice/image data which is shuffled and to which the outer parity is added at the SYNC & ID additional part 24. That is, the recording block unit is assigned on the magnetic tape 35 by the shuffling processing at the pack part 21 and the track interleave processing at the SYNC & ID additional part 24 for the first time.

The track interleave processing at the SYNC & ID additional part 24 is the processing for assigning equally the SYNC Block included in 30 (in case of the 525/60 structure NTSC method, 36 per 1 GOP in case of the 625/50 structure PAL method) ECC Blocks for the image data per 1 GOP and the SYNC Block included in 10 (in case of the 525/60 structure NTSC method, 12 per 1 GOP in case of the 625/50 structure PAL method) ECC Blocks for the voice data per 1 GOP to the 10 (in case of the 525/60 structure NTSC method, 12 per 1 GOP in case of the 625/50 structure PAL method) helical tracks of the magnetic tape per 1 GOP.

An object of the track interleave is to disperse the data error to plural ECC Blocks when a burst type error occurs on the magnetic tape in reproducing, to make the error correcting ability in each ECC Block effective and to advance the quality of the reproduced image.

As above described in the shuffling pattern, the image data which is compressed and encoded corresponding to the adjacent Macro Blocks, the Macro A and B, on the screen in FIG. 2 is stored on the different ECC Blocks in random order on each ECC Block stored in the memory 22 as shown in FIG. 4. Thus, by disposing the adjacent Macro Blocks on the different ECC Blocks, even if the burst type errors occur on the magnetic tape, the burst type errors are dispersed to plural ECC Blocks and it is possible to make use eraser correcting ability by the strong outer parity. Further, as above mentioned, in the shuffling pattern in the VCR according to the present invention, adjacent Macro Blocks on the screen are also disposed adjacent each other on the magnetic tape as a larger area on the screen is renewed by scanning once by the reproducing head.

In the conventional VCR, as the errors appeared together on the screen beyond the error correcting ability in usually reproducing in case of disposing the data as above mentioned, it was very unsightly image.

However, by using the track interleave pattern as above mentioned, the SYNC Blocks included in the ECC Block which is the error correcting unit are equally disposed over 10 tracks (in case of the 525/60 structure NTSC method, 12 tracks in case of the 625/50 structure PAL method). That is, considering the case of exceeding the error correcting range in usual reproduction as flaws on the magnetic tape and so on, the adjacent data on the magnetic tape should be surely entered into the different ECC Blocks.

Thus, the errors are equally dispersed to plural ECC Blocks in usual reproduction even if burst type errors occur, the adjacent Macro Blocks on the screen are surely included in the different ECC in case of exceeding the error correcting ability, therefore, it is almost possible to avoid that the individual ECC Block exceeds the correcting ability at the same time. That is, in usual reproduction, remarkable unsightliness because the adjacent Macro Blocks on the screen become errors at the same time is prevented, in search picture reproducing, the Macro Block of the large area is renewed on the screen by the shuffling pattern as above mentioned, therefore, it is easily possible to recognize the contents even in a scene that a movement is rapid.

Next, the reproducing speed control apparatus for controlling the speed of the tape traveling system 3 in reproducing the search picture will be described.

Here, relation between the traveling speed of the tape in reproducing the search picture and the renewed Macro Blocks on the screen will be described comparing with the conventional case that the Macro Blocks are disposed on the tape at random.

Figure 8:
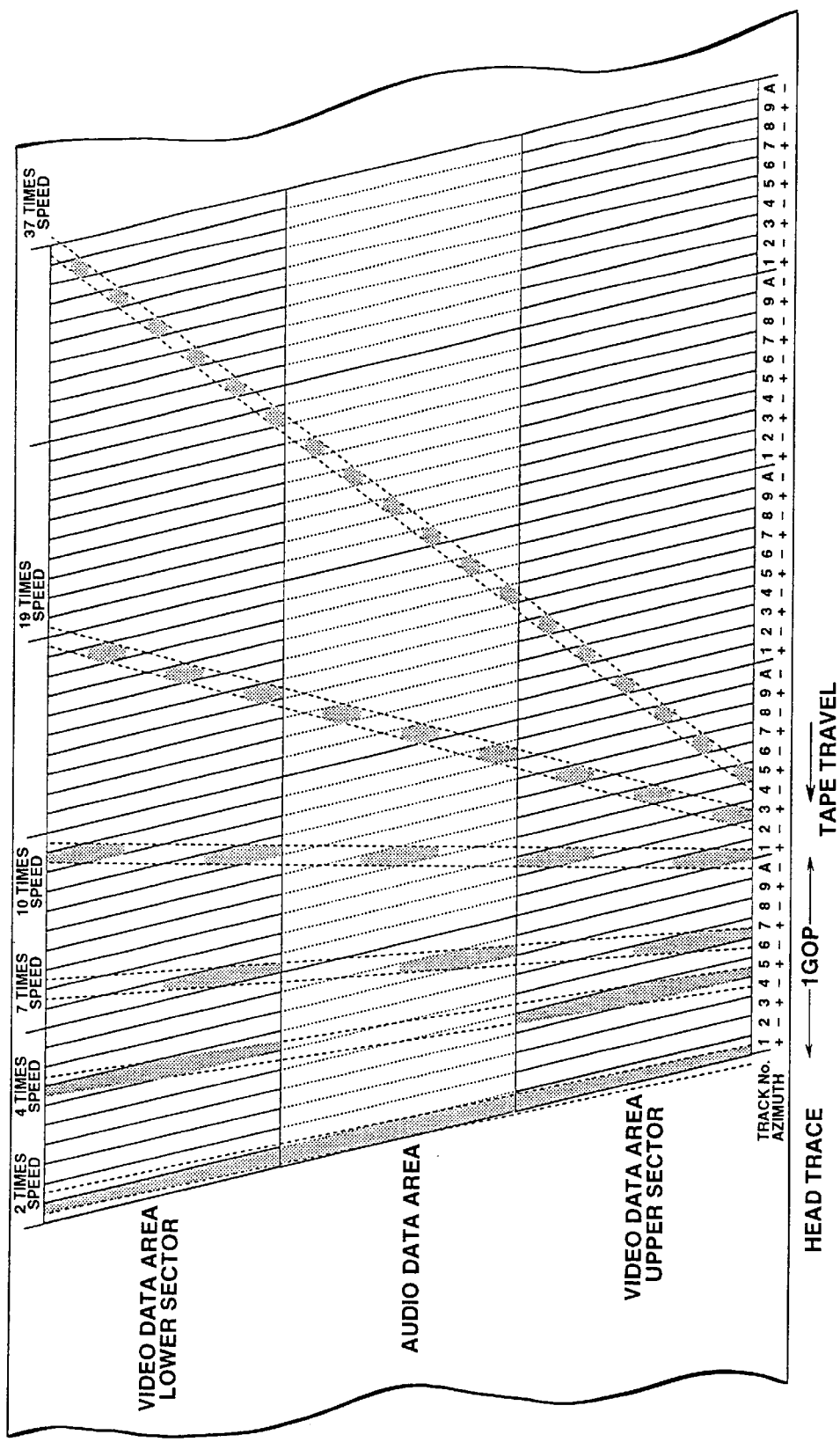
FIG. 8 is an explanatory view that reproducing heads trace tracks on a magnetic tape at different search speeds.

FIG. 8 shows a trace (Head Trace) which the reproducing head with the positive azimuth angle traces on the magnetic tape by scanning once in reproducing the search picture at speeds of 2, 4, 7, 10, 19 and 37 times. Then, the traveling direction of the magnetic tape (Tape Travel) is from right to left to the head on the rotating drum in the figure. The netted part shows the area on the track that the reproducing output more than 50% is obtained from the reproducing head. Further, FIGS. 9 through 13 show the parts on the screen renewed by using image data which the reproducing head reproduces by scanning once at the speeds of 2, 4, 7, 19 and 37 times of each speed as above mentioned. In each figure, the netted blocks are the renewed blocks.

When the reproducing head reads out the shuffled image/voice data from the helical track by scanning once as shown in FIG. 7, for example, the image data which is read out corresponds to the rectangular parts of two netted shuffling blocks in FIGS. 9A and 10A and it is possible to read out the image data of the wide area continued on the screen. That is, as shown in FIGS. 9B and 10B, it is possible to renew a part of the screen as a group of 72 Macro Blocks is a unit.

Then, when the data is disposed on the tape at random as usual, as shown in FIGS. 9C and 10C, the screen is renewed worm-eaten. As there are the older Macro Blocks around the renewed Macro Blocks, there is not correlation to the rapid image in reproducing the search picture, the boundary of the Macro Blocks becomes unsightly.

As shown in FIGS. 11A, 11B, 12A, 12B, 13A and 13B, it is possible to renewed a part of the screen as a group of 36 Macro Blocks (9×4=36) is a unit at the speed of 7 times, as a group of 12 Macro Blocks (3×4=12) is a unit at the speed of 19 times and as a group of 6 Macro Blocks (3×2=6) is a unit at the speed of 37 times. In this case, as shown in FIGS. 11C, 12C and 13C, the screen is also renewed worm-eaten when the data is disposed on the tape at random as usual.

As above mentioned, according to the shuffling pattern used for this VCR apparatus, it is possible to obtain the search picture reproduced as a part of the screen is renewed as a rectangular block is a unit at every speed of some times. Then, as a larger area on the screen is renewed by scanning the reproducing head once, it is possible to recognize easily the contents of the image.

Next, in the VCR for which the shuffling pattern and the track interleave method are used as above mentioned, the method for deciding the reproducing speed of the search picture fit for the case of using plural reproducing heads will be described.

A relational expression showing the proper reproducing speed (Search Speed) in reproducing the search picture given by, for example, an expression (1) is not always formed at all, further, there are cases that it is possible to obtain the reproducing screen with the higher quality of the screen by setting to the off-set search speed.

First the conventional search speed will be described again as follows, second the method for deciding the search speed fit for the VCR for which plural reproducing heads are used as the search speed which is not fit for the VCR with plural reproducing heads as an embodiment is shown will be described.

Figure 14A:
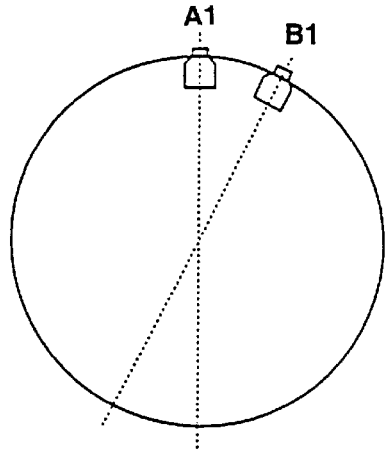
FIGS. 14A, 14B, 14C, 14D are explanatory view of disposing of reproducing heads on a rotating drum.

First, two heads structure as shown in FIG. 14A as above mentioned will be described as an example. In the following description, the NTSC method which records the data of 1 GOP on 10 tracks is an example and only the trace of the reproducing head with the positive azimuth angle is shown.

Figure 16:
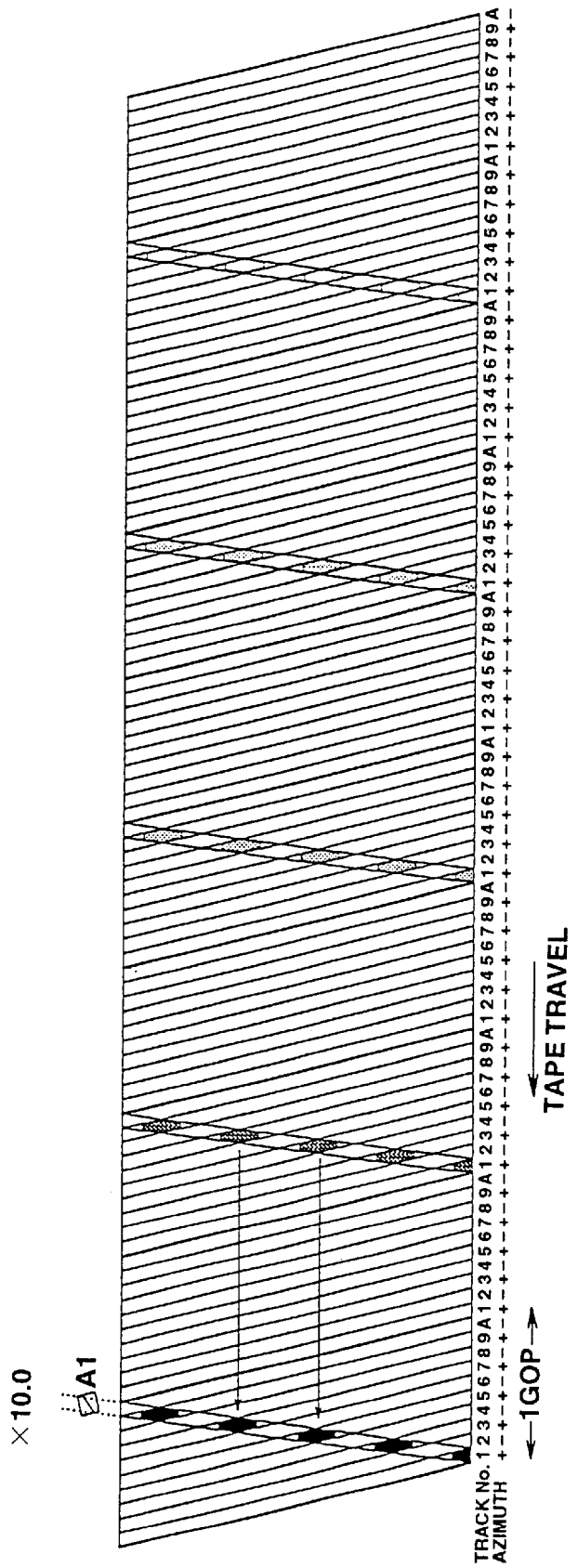
FIG. 16 is an explanatory view of head tracing in case of reproducing data of a NTSC method at speed of 10.0 times by 2 heads configuration.

FIG. 16 shows the trace in case that the reproducing head A1 with the positive azimuth angle provided on the rotating drum executes reproducing operation at the sapped of 10.0 times by the VCR of configuration of two heads. Then, the reproducing head A1 is not so-called on-track which traces correctly the helical track but traces crossing plural tracks. Further, when the drum is rotated, the reproducing head A1 which is rushed into the first Track (Track No. 1) of the first GOP by the first scanning is rushed into the first Track of the third GOP by the second scanning.

Thus, in reproducing correctly at the speed of 10.0 times, only the data of the netted part in FIG. 16 is renewed one after another and other data is not renewed at all. Therefore, only a part is renewed on the screen, other parts are not renewed at all and the search picture becomes very unsightly.

To avoid the situation as above mentioned, the search speed S in the conventional VCR of configuration of two heads is set to the speed given by the expression (1) as above mentioned.

$$S = (T/2) \times n \pm 0.5 \text{ [Times Speed]} \quad (1)$$

(n is an integer and T is the number of helical tracks for recording the image data of one screen.)

Table 1 shows the search speed S in case that the number T of the helical tracks on which the image data of the screen is recorded is 10 (the NTSC method) given by the expression (1). For example, in case of reproducing the image data of the NTSC method at the search speed near 10 times as speedy by the VCR of the two heads structure, T=10, n=2 and S is obtained as follows;

$$S = (10/2) \times 2 \pm 0.5 = 10.5 \text{ or } 9.5 \text{ [Times Speed]}$$

TABLE 1

| n | 1 | 2 | 3 | 4 | 5 | 6 | 7 | 8 | ... |
|---|---|---|---|---|---|---|---|---|---|
| S (+0.5) | 5.5 | 10.5 | 15.5 | 20.5 | 25.5 | 30.5 | 35.5 | 40.5 | ... |
| S (−0.5) | 4.5 | 9.5 | 14.5 | 19.5 | 24.5 | 29.5 | 34.5 | 39.5 | ... |

FIG. 17 shows the trace of the reproducing head A1 at 10.5 times as speedy. As known from the figure, at the seed of 10.5 times, the reproducing head A1 is rushed into a first track (Track No. 1) of a first GOP by a first scanning, a second track (Track No. 2) of a third GOP by a second scanning, a third track (Track No. 3) of a fifth GOP by a third scanning, . . . one after another. Similarly, at the steed of 9.5 times (not shown), the reproducing head A1 is rushed into a first track of a first GOP by a first scanning, a A-th track of a second GOP by a second scanning, a ninth track of a fourth GOP by a third scanning . . . , that is the search speed that a traced track is traveled one after another every scanning of the drum and the quality of the search picture is advanced by reproducing continuously the data of adjacent frames about time.

That as above mentioned is very effective in case of using the shuffling pattern so that the adjacent Macro Blocks on the screen are disposed to be adjacent on the tape for renewing the picture with a larger area by scanning the reproducing head once. That is, the pictures of the adjacent frames about time are also adjacent each other on the screen, the highly correlative pictures are continuous and the screen is renewed by a larger area.

Therefore, the effective search speed S in case that the VCR according to the present invention as above mentioned is configuration of two heads, according to the expression (1), is as shown in Table 2. In Table 2, only the case of +0.5 of the search speed given as ±0.5 in the expression (1) is shown.

TABLE 2

| n | 1 | 2 | 3 | 4 | 5 | 6 | 7 | 8 | ... |
|---|---|---|---|---|---|---|---|---|---|
| S (T = 10) | 5.5 | 10.5 | 15.5 | 20.5 | 25.5 | 30.5 | 35.5 | 40.5 | ... |
| S (T = 12) | 6.5 | 12.5 | 18.5 | 24.5 | 30.5 | 36.5 | 42.5 | 48.5 | ... |

In the VCR, the non-tracking method for executing the non-tracking processing in reproducing chooses and outputs the image/voice data, that is, the data that an error rate is the lowest reproduced by the reproducing heads that the azimuth angle is agree with the direction of the helical track and which traces correctly the helical track of a set of reproducing heads that two heads with positive azimuth angles and two heads with negative azimuth angles are provided on the rotating drum at intervals of one helical track as above mentioned. By adopting the non-tracking method, in the VCR, the condition of the tracking control of the reproducing heads to the helical track is largely reduced. In the VCR, the non-tracking method is realized by using twice of the number of the reproducing heads without changing the rotating number of the drum.

The case of using the search speed as above mentioned for the VCR for which plural reproducing heads are used in order to advance quality of the search picture by using the recording heads as the reproducing heads in searching as well as the reproducing heads corresponding to the non-tracking method and the VCR system as described here is considered.

Figure 14B:
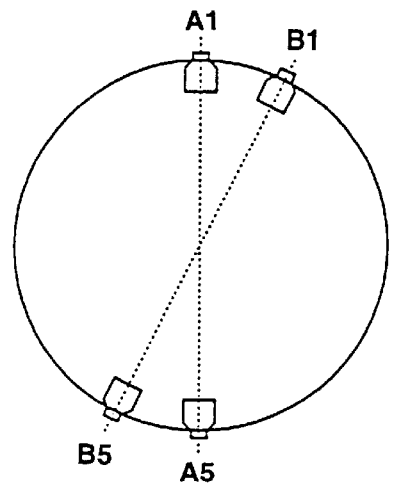
Figure 18A:
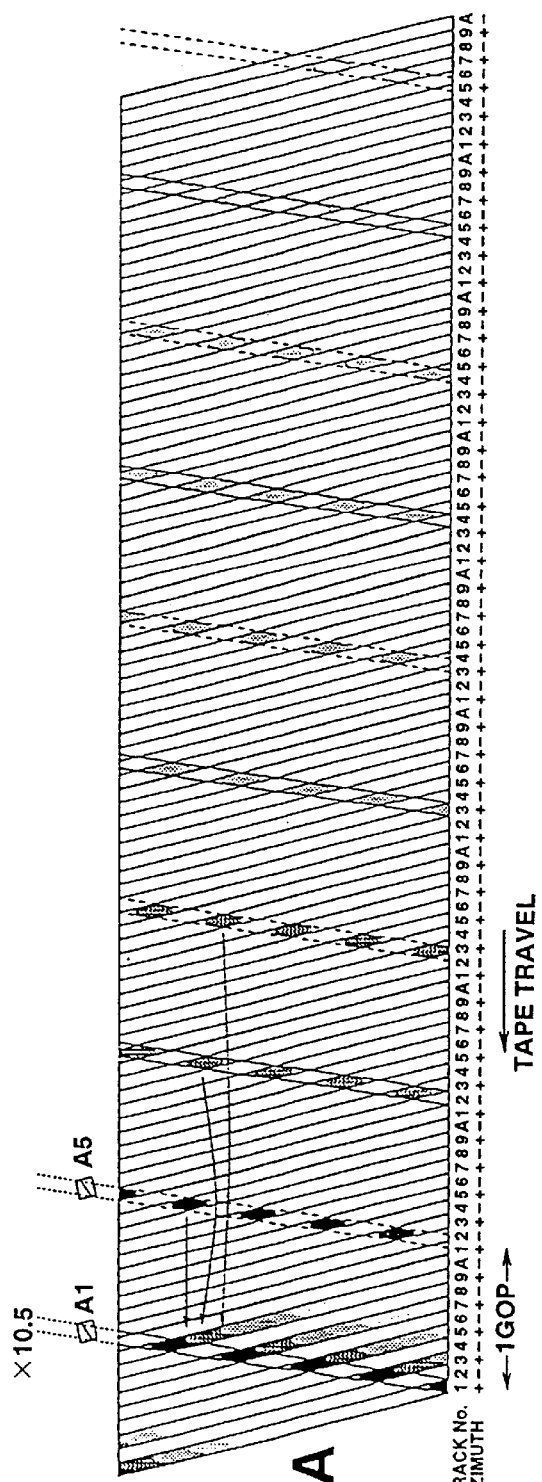
FIGS. 18A, 18B, are explanatory view of head tracing in case of reproducing data of a NTSC method at speed of 10.5 times by 4 heads configuration.

FIG. 18A shows the traces of the reproducing heads A1 and A5 when the data of the NTSC method is reproduced at the speed of 10.5 times by the VCR of configuration of 4 heads that 4 reproducing heads are disposed on the rotating drum as shown in FIG. 14B. This corresponds to the case of T=10 and n=2 in the expression (1).

Figure 18B:
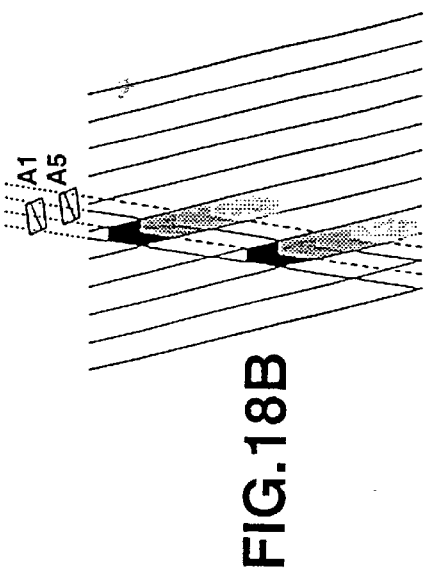

In this case, the reproducing head A5 traces the helical track traced by the proceeding reproducing head A1 with delay of the phase of a half track after that. That is, two reproducing heads A1 and A5 reproduce the data on the track of the same track number overlapping each other as shown by FIG. 18A and FIG. 18B that FIG. 18A is enlarged.

Generally, it is possible to reproduce the data if the reproducing head traces 50% of the width of the track. Therefore, the data renewed by one rotation of the drum is the same as the case of the two heads configuration that the trace is shown in FIG. 17. That is, the data obtained by scanning once by one reproducing head A1 as shown in FIG. 17B and the data obtained by scanning once by two reproducing heads A1 and A5 as shown in FIG. 18B renews the same data as a result as the data obtained from two reproducing heads A1 and A5 is more than the data obtained from one reproducing head A1 as shown in FIG. 17B but overlaps by the second scanning. That is, the additional reproducing head can not be used effectively.

In the VCR of 4 heads configuration with 4 reproducing heads which are twice of two reproducing heads which are at least necessary in usual reproduction, the search speed S is set as follows;

$$S = T \times m \pm 1.0 \text{ (Times Speed)}$$

(m is an integer and T is the number of helical tracks recording the image data of one screen.)

Table 3 shows the search speed S in case that the number T of the helical tracks that the image data of one screen is recorded is 10 (the NTSC method) given by an expression (2).

For example, in case of reproducing the image data of the NTSC method at the search speed of the speed of about 10 times, T=10, m=1 and S is obtained as follows;

$$S = 10 \times 1 \pm 1.0 = 11.0 \text{ or } 9.0 \text{ [Times Speed]}$$

TABLE 3

| m | 1 | 2 | 3 | 4 | 5 | 6 | ... |
|---|---|---|---|---|---|---|---|
| S (+1.0) | 11.0 | 21.0 | 31.0 | 41.0 | 51.0 | 61.0 | ... |
| S (−1.0) | 9.0 | 19.0 | 29.0 | 39.0 | 49.0 | 59.0 | ... |

Figure 19A:
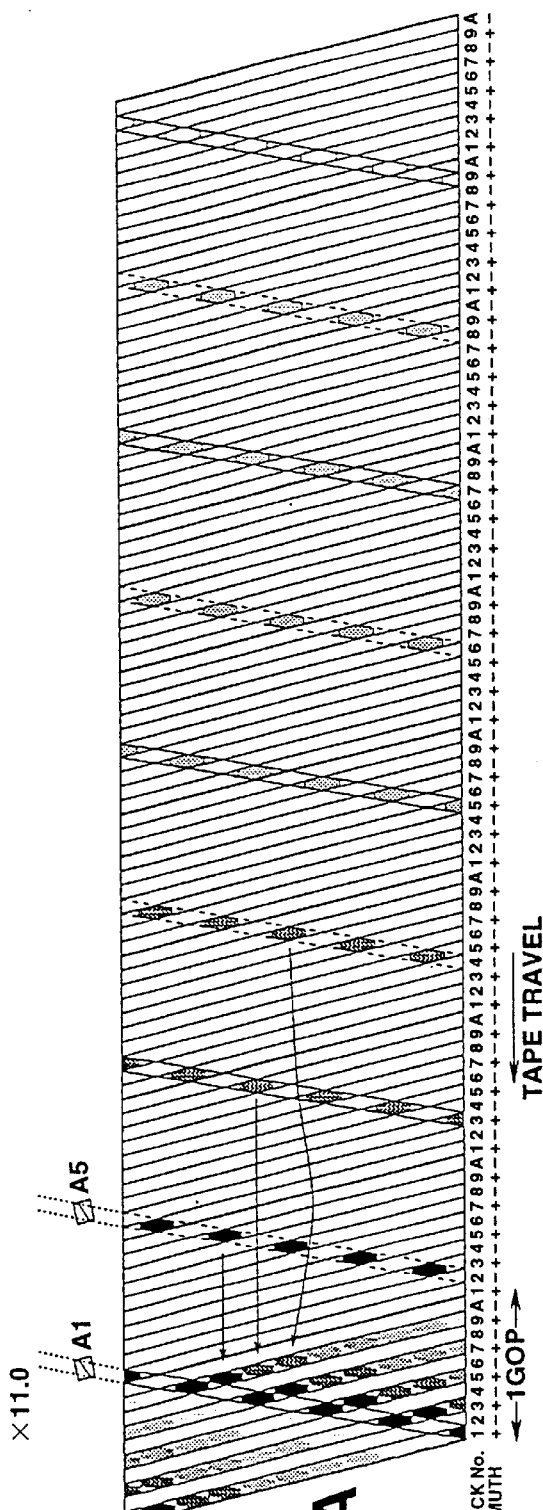
FIGS. 19A, 19B, are explanatory view of head tracing in case of reproducing data of a NTSC method at speed of 11.0 times by 4 heads configuration.
Figure 19B:
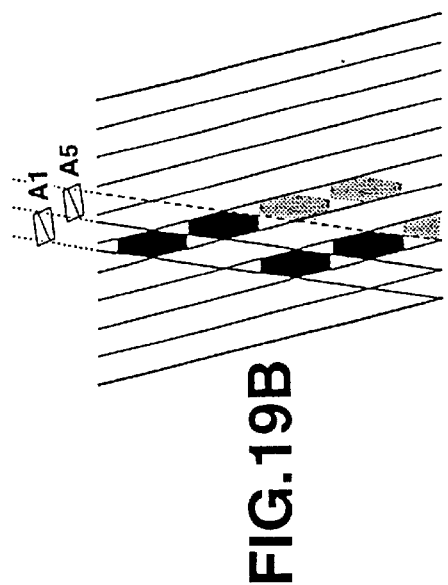

FIG. 19A shows the trace of the reproducing heads A1 and A5 at the speed of 11.0 times and FIG. 19B is that FIG. 19A is enlarged. As known from the figure, at the speed of 11.0 times, the reproducing head A1 is rushed into a first track of a first GOP by first scanning, a third track of a third GOP by second scanning, a fifth track of a fifth GOP by third scanning, . . . one after another, and two reproducing heads A1 and A5 with the same azimuth angle are possible to reproduce the data on the track of the same track number without overlapping and to reproduce the data of the adjacent GOP about time in order. Further, so far as the data reproduced by the second and the third scanning, similarly the data of adjacent frames about time is continuously reproduced.

Therefore, the effective search speed S in case that the VCR relating to the present invention includes 4 heads is shown in Table 4 according to the expression (2). In Table 4, the case of only +1.0 of the search speed given as ±1.0 in the expression (2) is shown.

TABLE 4

| m | 1 | 2 | 3 | 4 | 5 | ... |
|---|---|---|---|---|---|---|
| S (T = 10) | 11.0 | 21.0 | 31.0 | 41.0 | 51.0 | ... |
| S (T = 12) | 13.0 | 25.0 | 37.0 | 49.0 | 61.0 | ... |

In case of the 4 heads configuration, the expression (1) is also effective at the search speed which does not satisfy the expression (2). For example, in the expression (1), in case of T=10 and n=3, $$S = (10/2) \times 3 + 0.5 = 15.5 \text{ or } 14.5 \text{ [Times Speed]},$$

it does not satisfy the expression (2). That is, there are no track number T and no integer n that the search speed satisfies the speeds of 15.5 and 14.5 times.

FIG. 20A shows the traces of the reproducing heads A1 and A5 including 4 heads as shown in FIG. 14B in reproducing at 15.5 times as speedy.

Figure 17A:
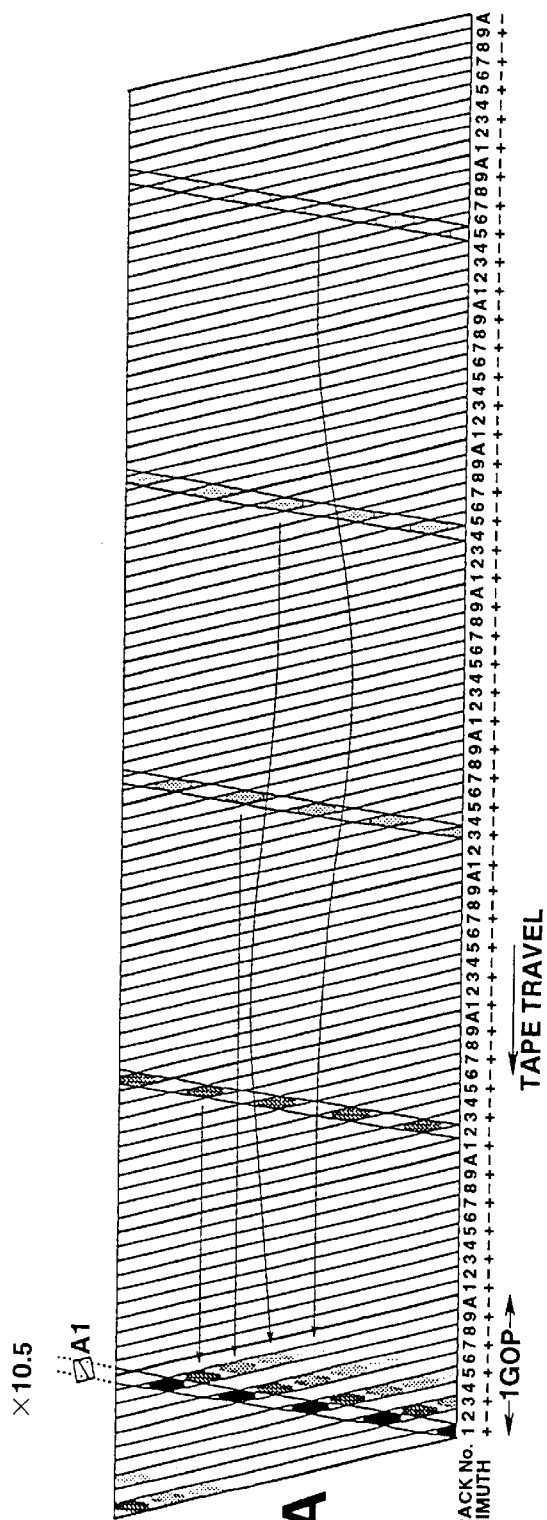
FIGS. 17A, 17B are explanatory view of head tracing in case of reproducing data of a NTSC method at speed of 10.5 times by 2 heads configuration.
Figure 17B:
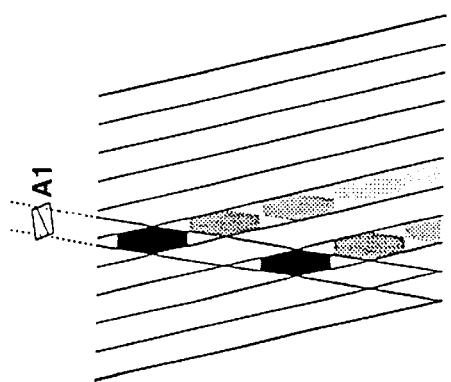

Though the data reproduced by the reproducing heads A1 and A5 is not continuous as the search speed given by the expression (2) as above mentioned, it is understood from FIG. 20A and FIG. 20B that FIG. 20A is enlarged that the data which the reproducing heads A1 and A5 reproduce does not overlap on the tracks of the same track number and the renewal rate of the screen is higher than that of FIGS. 17A and 17B by making the number of the reproducing heads plural. In this case, it is possible to renew the data on one screen by a half of the scanning number in case of two heads configuration.

Therefore, the search speeds S effective for the VCR consisting of 4 heads as shown in FIG. 14B are shown in Table 5 by using precedently the expression (2) and assistantly the expression (1). In Table 5, only the case of +1.0 of the search speeds given as ±1.0 by the expression (2) and the case of +0.5 of the search speeds given as ±0.5 by the expression (1) are shown.

TABLE 5

| | n = 1 | m = 1 | n = 3 | m = 2 | n = 5 | m = 3 | n = 7 | m = 4 | ... |
|---|---|---|---|---|---|---|---|---|---|
| S (T = 10) | 5.5 | 11.0 | 15.5 | 21.0 | 25.5 | 31.0 | 35.5 | 41.0 | ... |
| S | 6.5 | 13.0 | 18.5 | 25.0 | 30.5 | 37.0 | 42.5 | 49.0 | ... |

TABLE 5-continued

| | n = 1 | m = 1 | n = 3 | m = 2 | n = 5 | m = 3 | n = 7 | m = 4 | ... |
|---|---|---|---|---|---|---|---|---|---|
| (T = 12) | | | | | | | | | |

The VCR uses the non-tracking mechanism and is provided with the functions for reproducing all the data at the speed of 4 times (not so-called the search picture reproducing), and for transmitting to the memory apparatus such as a hard disc. Therefore, it corresponds to the speed of 4 times to the configuration of 4 heads for corresponding to non-tracking, that is, has 16 reproducing heads. Further, it is needless to say that it is also possible to include 8 heads possible to corresponding to the non-tracking method to the double speed. Next, the case that the expression (2) is applied for the VCR including 8 heads will be described.

Figure 14C:
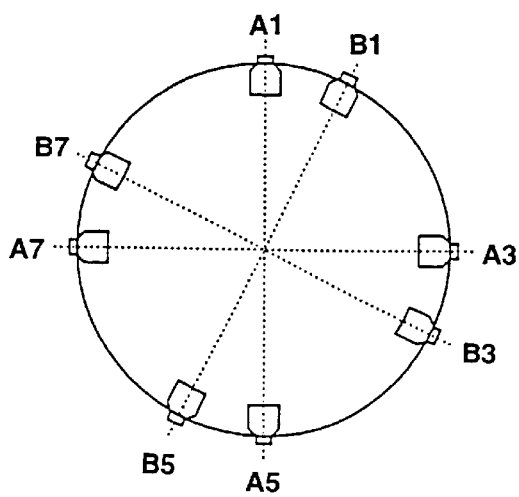
Figure 21A:
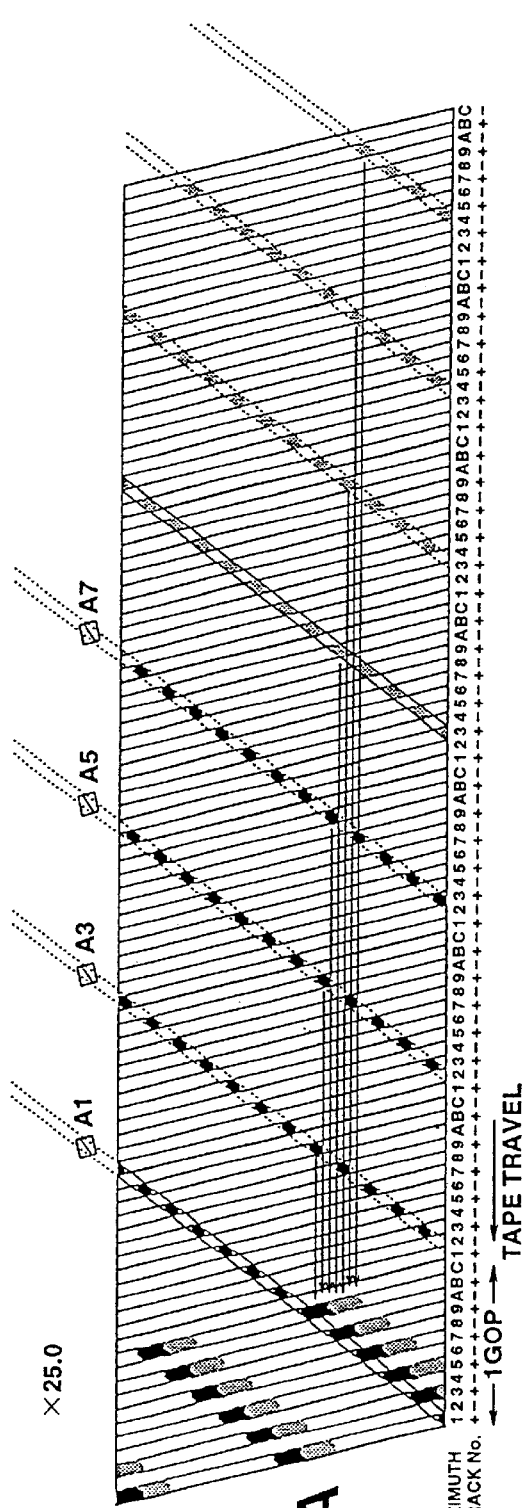
FIGS. 21A, 21B are explanatory view of head tracing in case of reproducing data of a PAL method at speed of 25.0 times by 8 heads configuration.

FIG. 21A shows the VCR of 8 heads configuration that 8 reproducing heads are disposed on the rotating drum as shown in FIG. 14C, and shows each trace of the reproducing heads A1, A3, A5 and A7 when the data of the PAL method is reproduced at the speed of 25 times. This corresponds to the case of T=12 and m=2 in the expression (2) (corresponding to the speed of 21 times in the NTSC method).

Figure 21B:
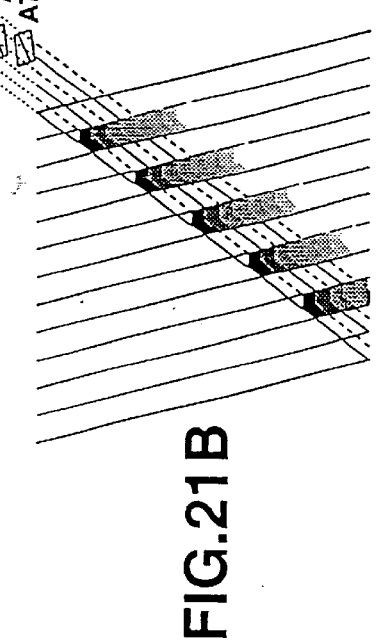

In this case, the reproducing head A3 traces the helical track which the preceding reproducing head A1 traces from behind with delay of the phase of a half of track. Further, the reproducing heads A5 and A7 also trace from behind with delay of the phase of a half of track respectively. That is, each of four reproducing heads A1, A3, A5 and A7 with the same azimuth angle overlaps and reproduces the data on the tracks with the same track number as known from FIG. 21A and FIG. 21B that FIG. 21A is enlarged.

As above mentioned, when the reproducing head generally traces 50% of the width of the track, it is possible to reproduce the data. Therefore, in case shown in FIG. 21A, the data renewed by rotating the drum once is the same as the case of 4 heads configuration that the trace is shown in FIG. 20. That is, even if the number of the reproducing heads is increased from 4 to 8, it is impossible to use effectively the additional reproducing heads.

Therefore, in the VCR of 8 heads configuration having 8 reproducing heads which are 4 times as many as 2 reproducing heads at least necessary for usual reproduction, the search speed S is set as follows;

$$S = 2 \times T \times k \pm 2.0 \text{ [Times Speed]} \quad (3)$$

(k is an integer and T is the number of helical tracks for recording the image data of one screen.)

Table 6 shows the search speed S in case that the number T of the helical track number that the image data of one screen is recorded is 12 (the PAL method) given by the expression (2).

For example, when the image data of the PAL method is reproduced by the search speed at the speed of about 24 times in the VCR of 8 heads configuration, it corresponds to T=12, k=1 and S is obtained as follows;

$$S = 2 \times 12 \times 1 \pm 2.0 = 26.0 \text{ or } 22.0 \text{ [Times Speed]}$$

TABLE 6

| k | 1 | 2 | 3 | 4 | ... |
|---|---|---|---|---|---|
| S (+2.0) | 26.0 | 50.0 | 74.0 | 98.0 | ... |
| S (−2.0) | 22.0 | 46.0 | 70.0 | 94.0 | ... |

Figures 22A, 22B:
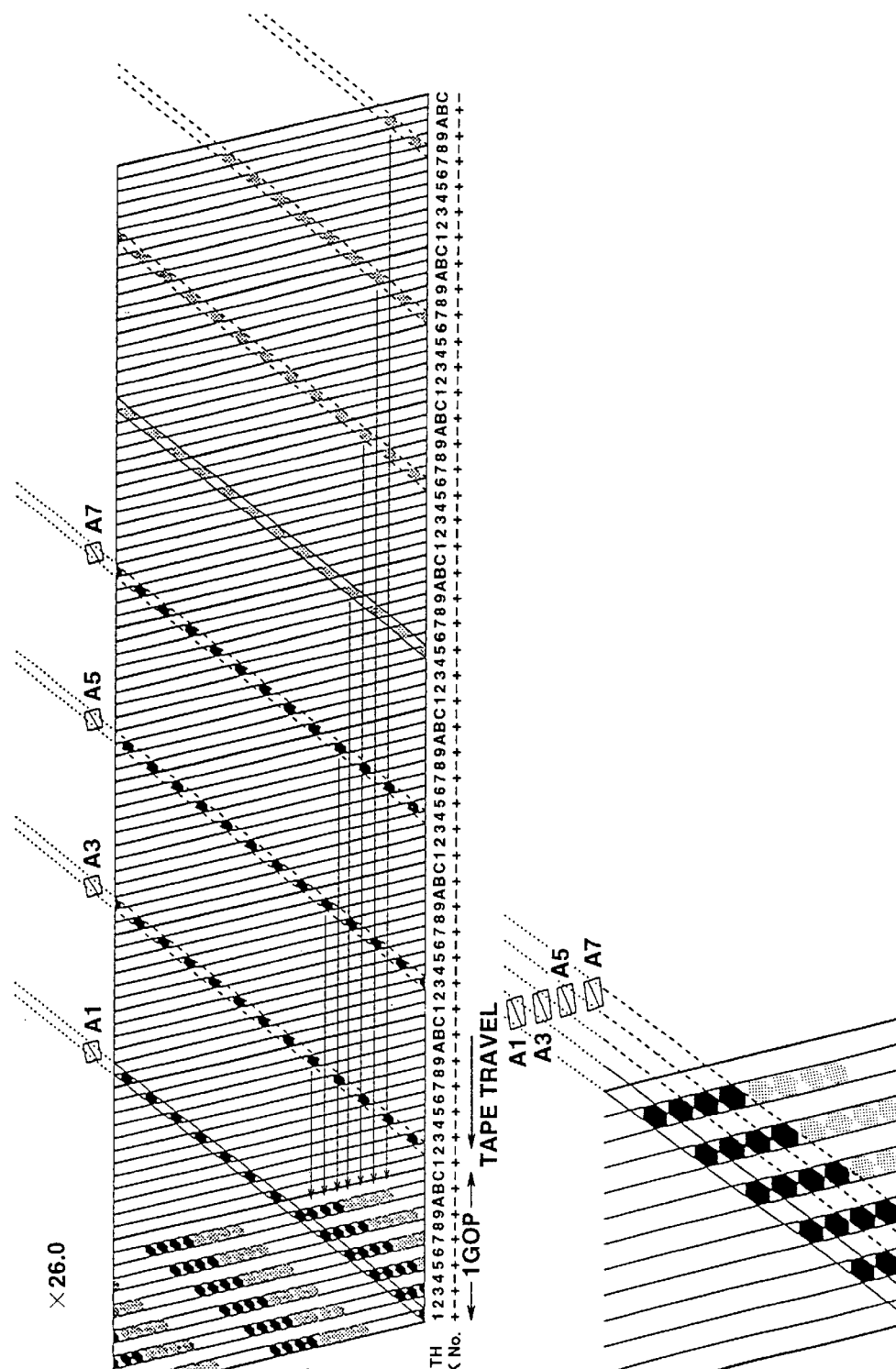
FIGS. 22A, 22B are explanatory view of head tracing in case of reproducing data of a PAL method at speed of 26.0 times by 8 heads configuration.

FIG. 22A shows the traces of the reproducing heads A1, A3, A5 and A7 at the speed of 26.0 times, and FIG. 22B is that FIG. 22A is enlarged. As known from the figure, at the speed of 26.0 times, the reproducing head A1 is rushed into a first track of a first GOP by a first scanning of the drum, a fifth track of a fifth GOP by a second scanning . . . one after another. Similarly, the reproducing head A3 is rushed into a second track of a second GOP by a first scanning of the drum, a sixth track of a sixth GOP by a second scanning . . . one after another. Similarly, the reproducing head A5 is rushed into a third track of a third GOP by a first scanning of the drum, a seventh track of a seventh GOP by a second scanning . . . one after another. Similarly, the reproducing head A7 is rushed into a fourth track of a fourth GOP by a first scanning of the drum, a eighth track of a eighth GOP by a second scanning . . . one after another. Therefore, each of reproducing heads A1, A3, A5 and A7 with four same azimuth angles reproduces the data on the tracks with the same track number without overlapping, and the reproducing heads A1, A3, A5 and A7 are possible to reproduce the data of adjacent GOP about time in good order. So far as the data reproduced by the second and the third scanning is similarly reproduced, the data of adjacent frames about time is continuously reproduced. Therefore, the effective search speed S is as shown in Table 7 according to the expression (3) when the VCR according to the present invention includes 8 heads. In Table 7, only the case of +2.0 of the search speed given as ±2.0 in the expression (3) is shown.

TABLE 7

| k | 1 | 2 | 3 | 4 | ... |
|---|---|---|---|---|---|
| S (T = 10) | 220 | 42.0 | 62.0 | 82.0 | ... |
| S (T = 12) | 26.0 | 50.0 | 74.0 | 98.0 | ... |

In case of 8 heads configuration, the expressions (1) and (2) are also effective at the speed which does not satisfy the expression (3). For example, in case of T=12 and n=3 in the expression (1), $$S = (12/2) \times 3 \pm 0.5 = 18.5 \text{ or } 17.5 \text{ [Times Speed]},$$

the speed does not the expression (3). That is, there is neither track number T nor integer k that the search speed satisfies the speeds of 18.5 and 17.5 times.

Figure 23A:
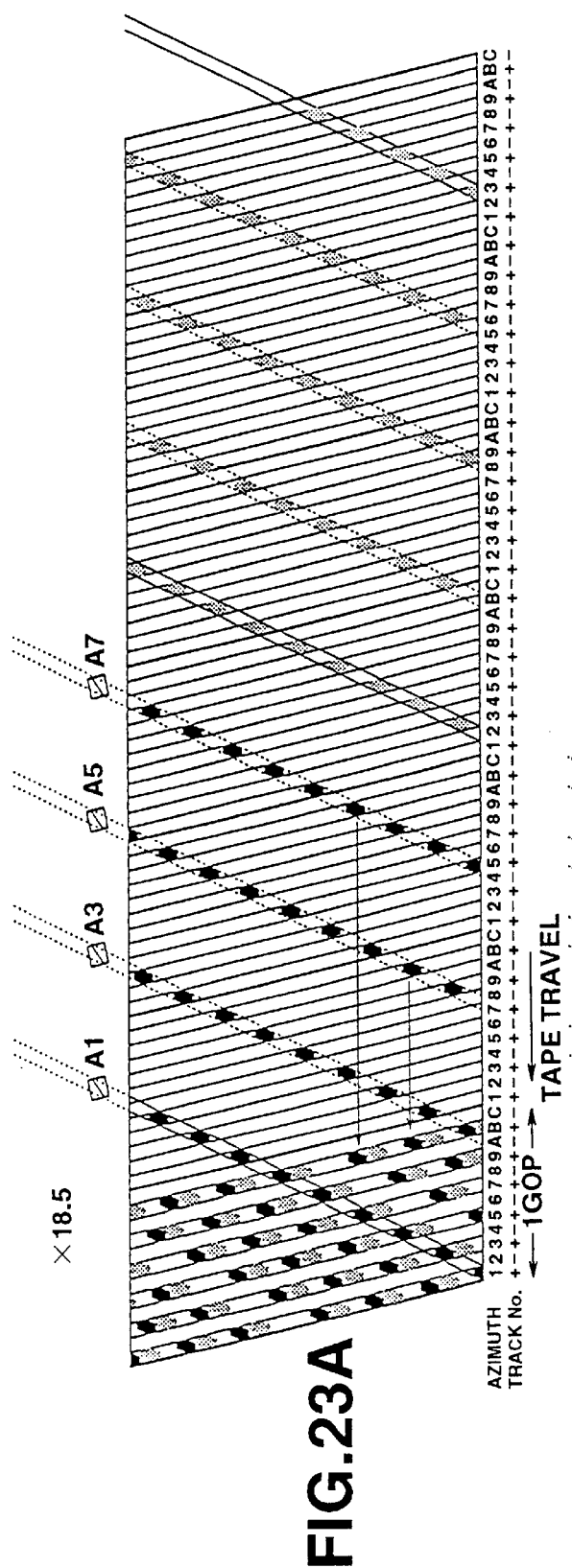
FIGS. 23A, 23B are explanatory view of head tracing in case of reproducing data of a PAL method at speed of 18.5 times by 8 heads configuration.

FIG. 23A shows the trace of each of reproducing heads A1, A3, A5 and A7 of 8 heads configuration as shown in FIG. 14C in reproducing at the speed of 18.5 times.

Figure 23B:
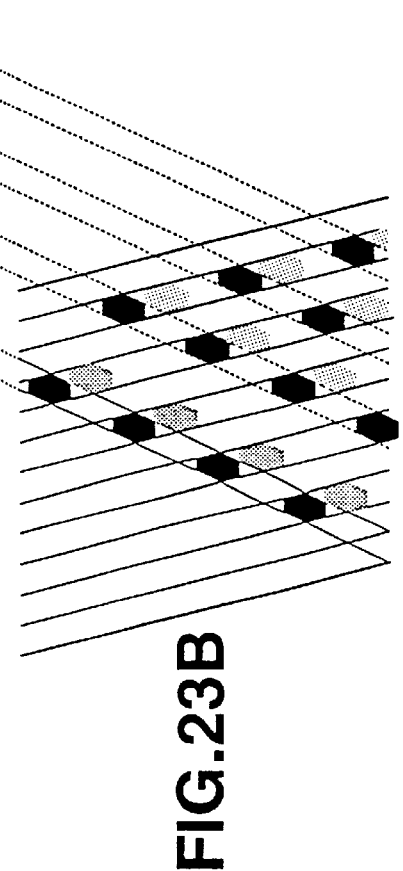

It is understood from FIG. 23A and FIG. 23B that FIG. 23A is enlarged that the data reproduced by each of reproducing heads A1, A3, A5 and A7 does not overlap on the tracks with the same track number each other though the data reproduced by each of the reproducing heads A1, A3, A5 and A7 does not continue as the search speed as above mentioned as given by the expression (3), and the renewal rate of the screen is raised by making the reproducing heads plural. In this case, it is possible to renew the data of one screen by one fourth of the scanning number in case of 4 heads configuration.

Therefore, the search speeds S effective for the VCR of 8 heads configuration as shown in FIG. 14C are shown in Table 8 by using precedently the expression (3) and assistantly the expression (1) and (2). In Table 8, only the case of +2.0 of the search speeds given as ±2.0 in the expression (3), the case of +1.0 of the search speeds given as ±1.0 in the expression (1) and the case of +0.5 of the search speeds given as ±0.5 in the expression (1) are shown.

TABLE 8

|  | n = 1 | m = 1 | n = 3 | k = 1 | n = 5 | m = 3 | n = 7 | k = 2 | ... |
|---|---|---|---|---|---|---|---|---|---|
| S (T = 10) | 5.5 | 11.0 | 15.5 | 22.0 | 25.5 | 31.0 | 35.5 | 42.0 | ... |
| S (T = 12) | 6.5 | 13.0 | 18.5 | 25.0 | 30.5 | 37.0 | 42.5 | 50.0 | ... |

Last, the case that the expression (3) is applied to the VCR of 16 heads configuration.

Figure 14D:
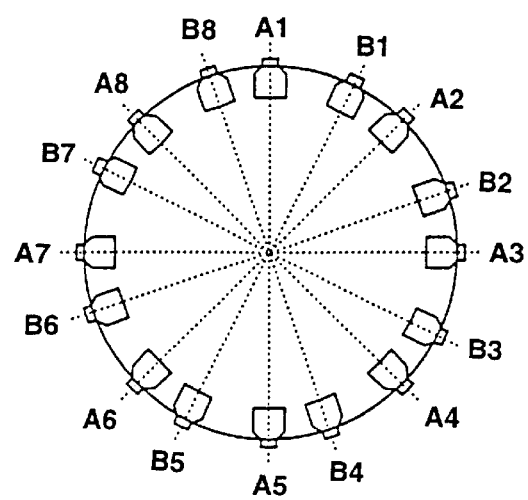

As shown in FIG. 14D, the case of reproducing the data of the PAL method by the VCR of 16 heads configuration which 16 reproducing heads are disposed at regular intervals and at regular height on the rotating drum will be considered. As the figure showing the trace of each reproducing head in this case is too complicated, it is neglected. In case of T=12 and k=2 at the expression (3) similar to the case that has been described until now, reproducing of the search picture at the speed of 50 times is considered.

In this case, the reproducing head A2 traces the track which the preceding reproducing head A1 has traced from behind with a delay of the phase of a half of tracks. Further, the reproducing heads A3, A4, A5, A6, A7 and A8 also trace from behind with the delay of the phase of a half of tracks respectively. That is, the reproducing heads A1, A2, A3, A4, A5, A6, A7 and A8 with 8 same azimuth angles reproduce overlapping the data on the tracks with the same track number. That is, even if the number of the reproducing heads is increased from 8 to 16, it is impossible to use effectively the additional reproducing heads.

Therefore, in the VCR of 16 heads configuration having 16 reproducing heads of 8 times to at least two reproducing heads necessary for reproducing usually, the search speed S is set as follows;

$$S = 4 \times T \times j + 4.0 \text{ [Times Speed]} \quad (4)$$

(j is an integer and T is the number of the helical tracks which records one screen.)

Table 9 shows the search speed S in case that the number T of the helical tracks that the image data of one screen is recorded is 12 (the PAL method) given in the expression (4).

For example, in case of reproducing the image data of the PAL method at the search speed of about 48 times in the VCR of 16 heads configuration, T=12, j=1 and S is obtained as follows;

$$S = 4 \times 12 \times 1 \pm 4.0 = 52.0 \text{ or } 44.0 \text{ [Times Speed]}$$

TABLE 9

| j | 1 | 2 | ... |
|---|---|---|---|
| S (+4.0) | 52.0 | 100.0 | ... |
| S (−4.0) | 44.0 | 92.0 | ... |

Considering the trace of each reproducing head at the speed of 52.0 times, similarly to the case which has been described until now, the reproducing head A1 is rushed into a first track of a first GOP by a first scanning of the drum, a ninth track of a ninth GOP by a second scanning . . . . Similarly, the reproducing head A2 is rushed into a second track of a second GOP by a first scanning of the drum, a A-th track of a tenth GOP by the second scanning . . . . Similarly, the reproducing head A3 is rushed into a third track of a third GOP by a first scanning of the drum, a B-th track of a eleventh GOP by the second scanning . . . . Similarly the reproducing head A4 is rushed into a fourth track of a fourth GOP by the first scanning of the drum, the C-th track of a twelfth GOP by the second scanning . . . . Similarly, the reproducing head A5 is rushed into a fifth track of a fifth GOP by the first scanning of the drum, a first track of a thirteenth GOP by the second scanning . . . . Similarly, the reproducing head A6 is rushed into a sixth track of a sixth GOP by the first scanning of the drum, a second track of a fourteenth GOP by the second scanning . . . . Similarly, the reproducing head A7 is rushed into a fifth track of a seventh GOP by a seventh scanning of the drum, a third track of a fifteenth GOP by the second scanning . . . . Similarly, the reproducing head A8 is rushed into a eighth track of a eighth GOP by the first scanning of the drum, a fourth track of a sixteenth GOP by the second scanning . . . . Therefore, each of the reproducing heads with eight same azimuth angles of A1, A2, A3, A4, A5, A6, A7 and A8 reproduces the data on the tracks with the same track without overlapping, and each of the reproducing heads A1, A2, A3, A4, A5, A6, A7 and A8 are possible to reproduce the data of adjacent GOP about time in good order. So far as the data reproduced by the second and the third scanning is similarly reproduced, the data of adjacent frames about time is continuously reproduced.

Therefore, the search speed S effective for the VCR of 16 heads configuration as shown in FIG. 14D is shown in Table 10 according to the expression (4). In Table 10, only the case of +4.0 of the search speed given as ±4.0 in the expression (4) is shown.

TABLE 10

| j | 1 | 2 | ... |
|---|---|---|---|
| S (T = 10) | 44.0 | 84.0 | ... |
| S (T = 12) | 52.0 | 100.0 | ... |

In case of 6 heads configuration, the expressions (1) through (3) are also effective at the search speed which does not satisfy the expression (4).

Though the data reproduced by each of the reproducing heads A1, A2, A3, A4, A5, A6, A7 and A8 is not continued as the search speed S as above mentioned given by the expression (4), the data reproduced by each of the reproducing heads A1, A2, A3, A4, A5, A6, A7 and A8 does not overlap on the tracks with the same track number and the renewal rate of the screen is raised by making the number of the reproducing heads plural.

Therefore, the search speeds S effective for the VCR of 16 heads configuration as shown in FIG. 14D are the speed as shown in Table 11 by using precedently the expression (4) and assistantly the expression (1) through (3). In Table 11, only the case of +4.0 of the search speeds given as ±4.0 in the expression (4), the case of +2.0 of the search speeds given as ±2.0 in the expression (3), the case of +1.0 of the search speeds given as ±1.0 in the expression (2) and the case of +0.5 of the search speeds given as +0.5 by the expression (1) are shown.

TABLE 11

|  | n = 1 | m = 1 | n = 3 | k = 1 | n = 5 | m = 3 | n = 7 | j = 1 | ... |
|---|---|---|---|---|---|---|---|---|---|
| S (T = 10) | 5.5 | 11.0 | 15.5 | 22.0 | 25.5 | 31.0 | 35.5 | 44.0 | ... |
| S (T = 12) | 6.5 | 13.0 | 18.5 | 25.0 | 30.5 | 37.0 | 42.5 | 52.0 | ... |

As above mentioned, the optimum search speed depends on the number of the reproducing heads. From (1) through (4), in case that plural reproducing heads are disposed at regular intervals on the rotating drum in spite of the configuration less than 16 heads, it is possible to express by using the following expression (5).

$$S=(H_n/2)\times(T\times n\pm 1.0) \quad (5)$$

($H_n$ is the number of the reproducing heads with the same azimuth angle, n is an integer and T is the number of the helical tracks which record recording one screen.)

However, it is actually hard to dispose 16 reproducing heads on the rotating drum at regular intervals as shown in FIG. 14D. Specifically, a recording head REC A/B, an erasing head ERASE, a dummy head DUMMY and so on are necessary except the reproducing heads A1 through A8/B1 through B8, further, the analog reproducing heads Y-A/B, C-A/B are sometimes provided so that it is possible to make compatible and reproduce the magnetic tape recorded by the conventional analog method.

Figure 15:
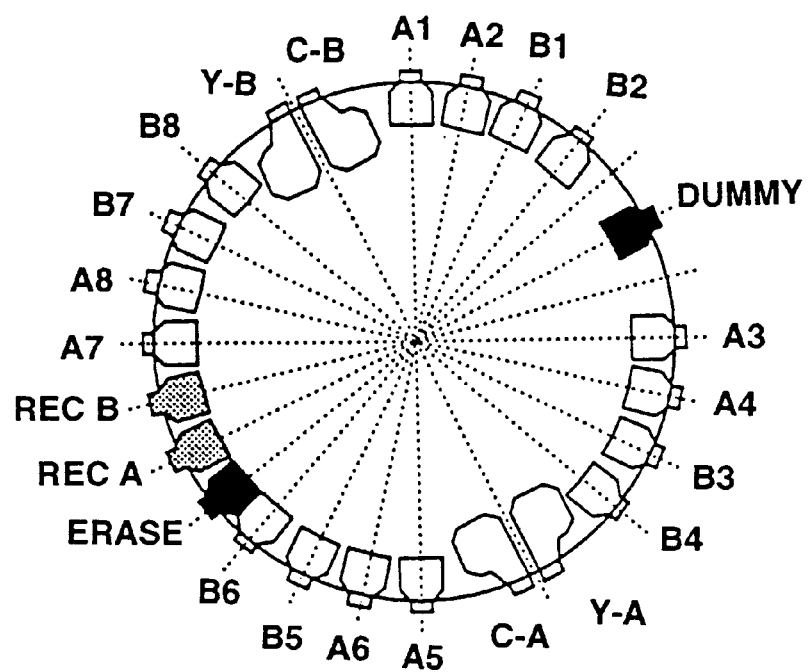
FIG. 15 is an explanatory view of an example of disposing of heads of configuration of 16 heads.

Therefore, under the restricted condition as above mentioned, 16 reproducing heads in the actual VCR are disposed, for example, as shown in FIG. 15. That is, each of the reproducing heads A2, A4, A6 and A8 are disposed adjacent to the reproducing heads A1, A3, A5 and A7. Then, it is corrected that it is impossible to dispose the reproducing heads on the drum at regular intervals by changing installed height of each head.

In the VCR according to the present invention, all the data is reproduced by the non-tracking method to the speed of 4 times by adjusting disposing and installed height on the rotating drum of the reproducing heads as above mentioned and the high speed reproducing function of the speed of 4 times as above mentioned is realized.

However, when the search speed becomes higher, it is impossible to correct as the reproducing heads are disposed at regular intervals by the installed height of the reproducing heads but not impossible to correct. That is, the expression (4) is not satisfied by the disposing of the reproducing heads in FIG. 15.

Further, it is not always possible to dispose the reproducing heads at regular intervals as shown in FIGS. 14B through 14D in the VCR to advance the quality of the search picture by using plural reproducing heads by the method for using the recording head as the reproducing head in searching as well as the reproducing head of the non-tracking method of the VCR according to the present invention as above mentioned.

Therefore, it is considered to find simply the search speed fit for the VCR having various disposing of heads. That is, it is calculated about arbitrary speeds (for example, every speed of 0.1 times) by how many scanning number of the drum it is possible to reproduce the data of all the Macro Blocks forming the screen by using the plural reproducing heads disposed on the drum and the parameters of the tape traveling system about the search speeds which do not satisfy the expressions (1) through (3) in the VCR (except the case of configuration of 16 heads) as above mentioned and the various VCR that the reproducing heads are not disposed at regular intervals on the rotating drum as the case of configuration of 16 heads in this VCR.

All the Macro Blocks forming the screen should be reproduced by the small number of scanning in order to advance the quality of the search picture. That is, it is desired that a time interval to renew the screen is short (the renewal rate of the screen is high.) Therefore, the search speed of the small scanning number of the dram scanning number every search speed found by calculation as above mentioned may be precedently chosen.

For example, at the speed that the traces of plural reproducing heads overlap each other, the scanning number necessary for renewing all the Macro Blocks forming the screen becomes more than that at the speed at the neighborhood, therefore, the speed should be avoided and the speed that the scanning number at the neighborhood becomes small may be chosen.

At the search speed chosen by this setting method, the data of adjacent frames about time on the magnetic tape is not always reproduced continuously in good order as the search speed given by the expressions (1) through (4) as above mentioned. However, though there are a lot of cases that the search speeds which can not satisfy the expressions (2), (3) and (4) is found in the VCR used for broadcasting business, the search speeds which satisfies these expressions are limited. If in case as above mentioned it is possible to calculate by how many scanning number of the drum all the Macro Blocks forming the screen can be reproduced and possible to set to the speed of small scanning number, the traces of at least plural reproducing heads overlap and it is possible to avoid that the renewing rate of the screen gets worse. That is, it is possible to improve the quality of the search picture by using effectively the additional reproducing head.

Further, in the VCR system, the method for changing the shuffling pattern called track alternation is adopted. It is possible to reproduce all the Macro Blocks on the screen in spite of thinning out about time by alternating the Macro Blocks recorded on the odd and the even tracks every GOP, that is, by executing the inserting processing (the freezing processing) the former screen into the lacked part as it was even if, for example, the recording head clogs, the recording of the image data is continuously impossible and it is beyond the outer correcting ability in reproducing.

Though it is very complicated to find the optimum speed because the number of parameters for finding the search speed for using effectively plural reproducing heads increases by using this track alternation, it is possible to find comparatively easily the proper search speed by using the method for setting to the speed that the scanning number is small by calculating by how many scanning number of a drum it is possible to reproduce all the Macro Blocks forming the screen.

Figure 24:
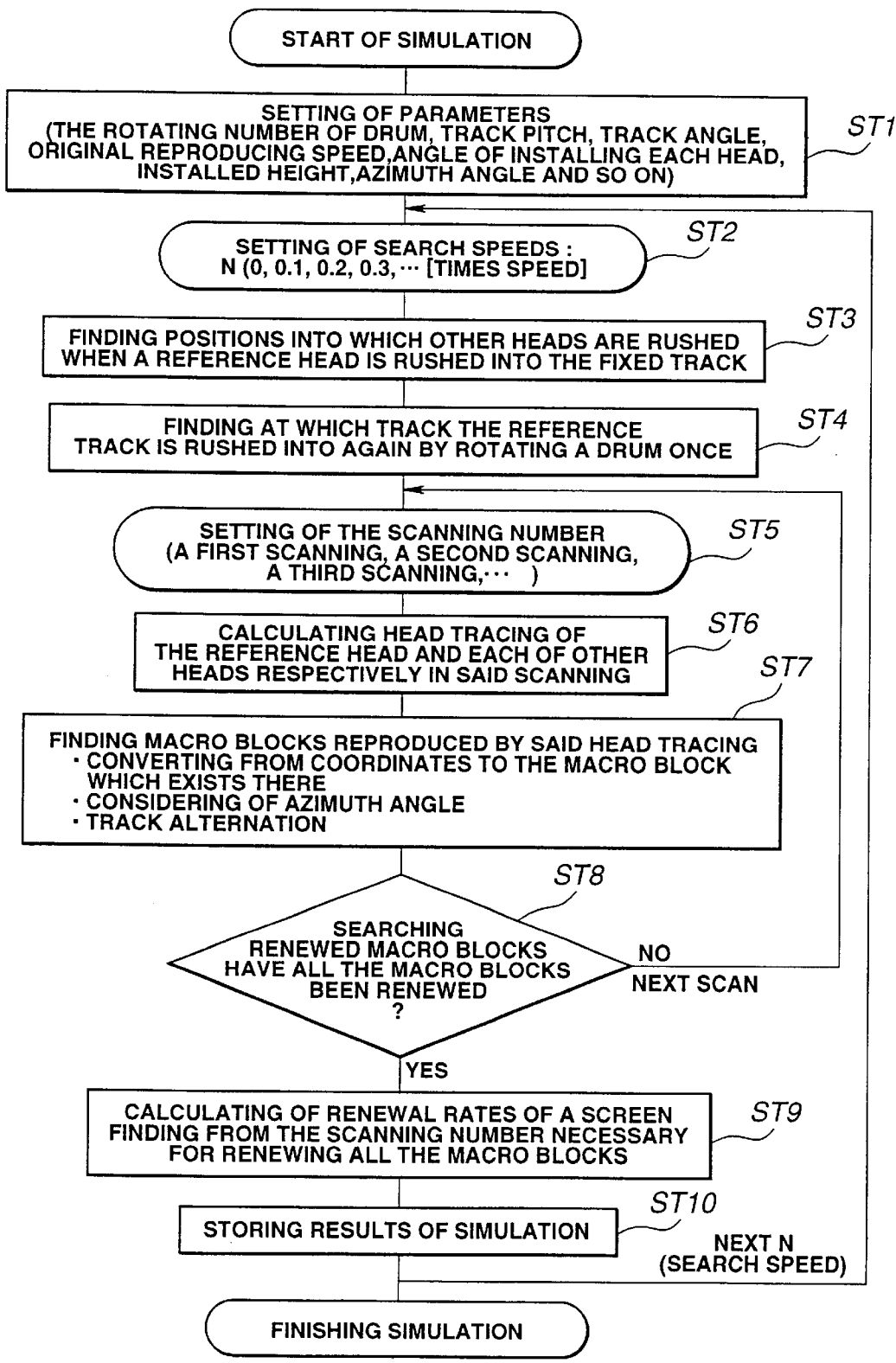
FIG. 24 is a flowchart showing an example of a procedure for calculating a renewal rate of a screen from parameters of reproducing heads and search speed.
Figure 25:
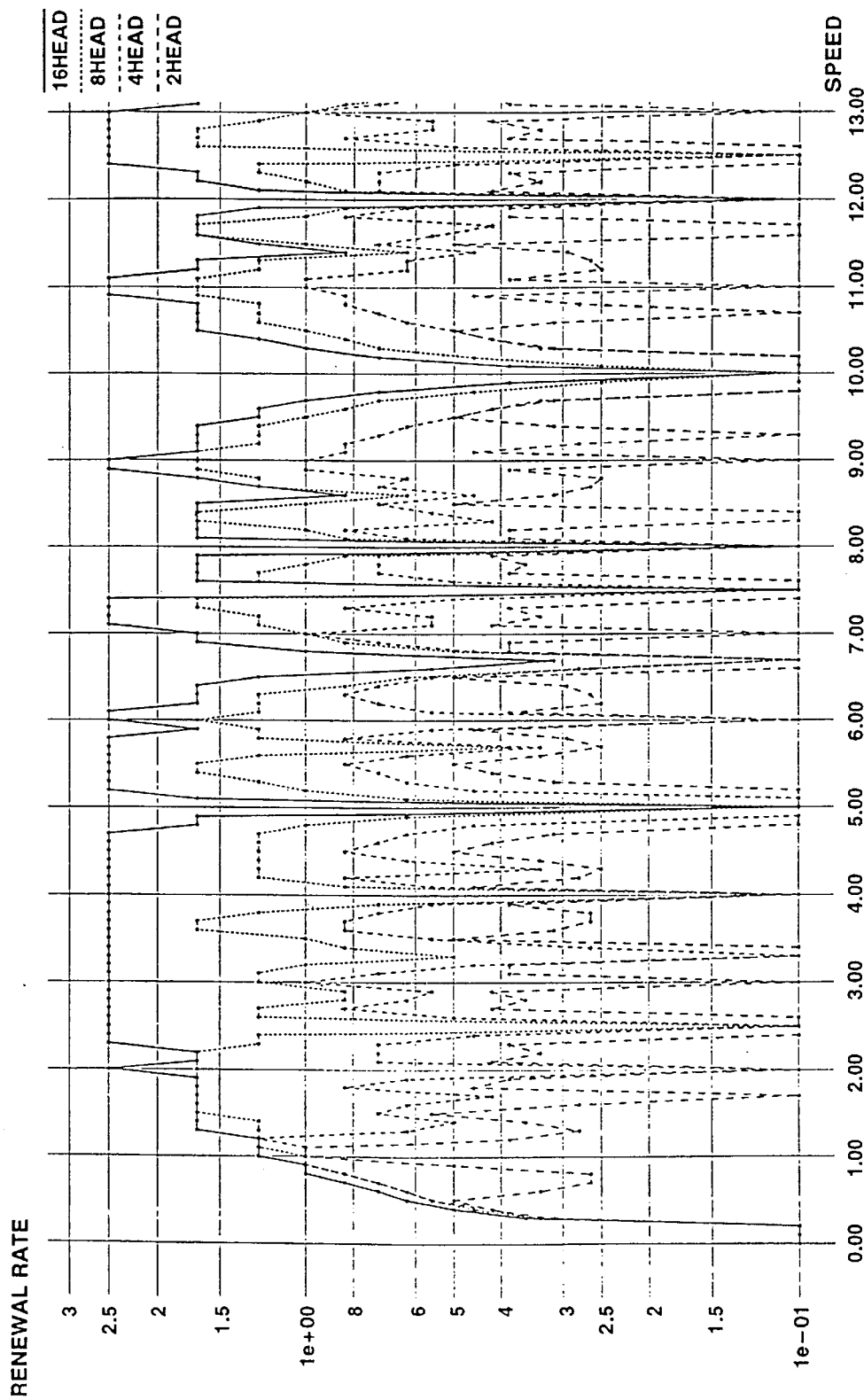
FIG. 25 is a first view showing an example of a result of calculation of a renewal rate of a screen in case of reproducing data of a NTSC method at each search speed.
Figure 26:
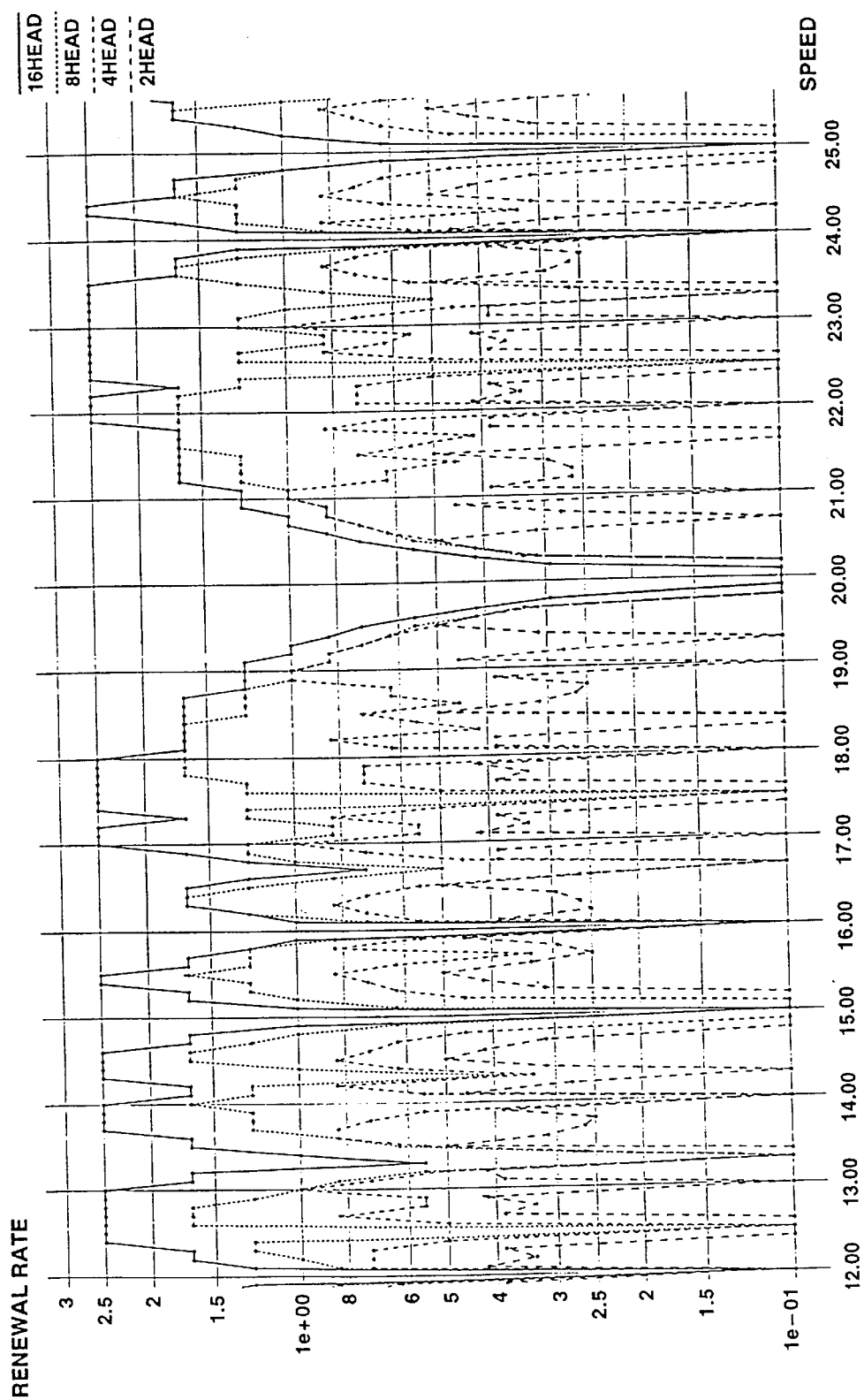
FIG. 26 is a second view following a first view showing an example of a result of calculation of a renewal rate of a screen in case of reproducing data of a NTSC method at each search speed.
Figure 27:
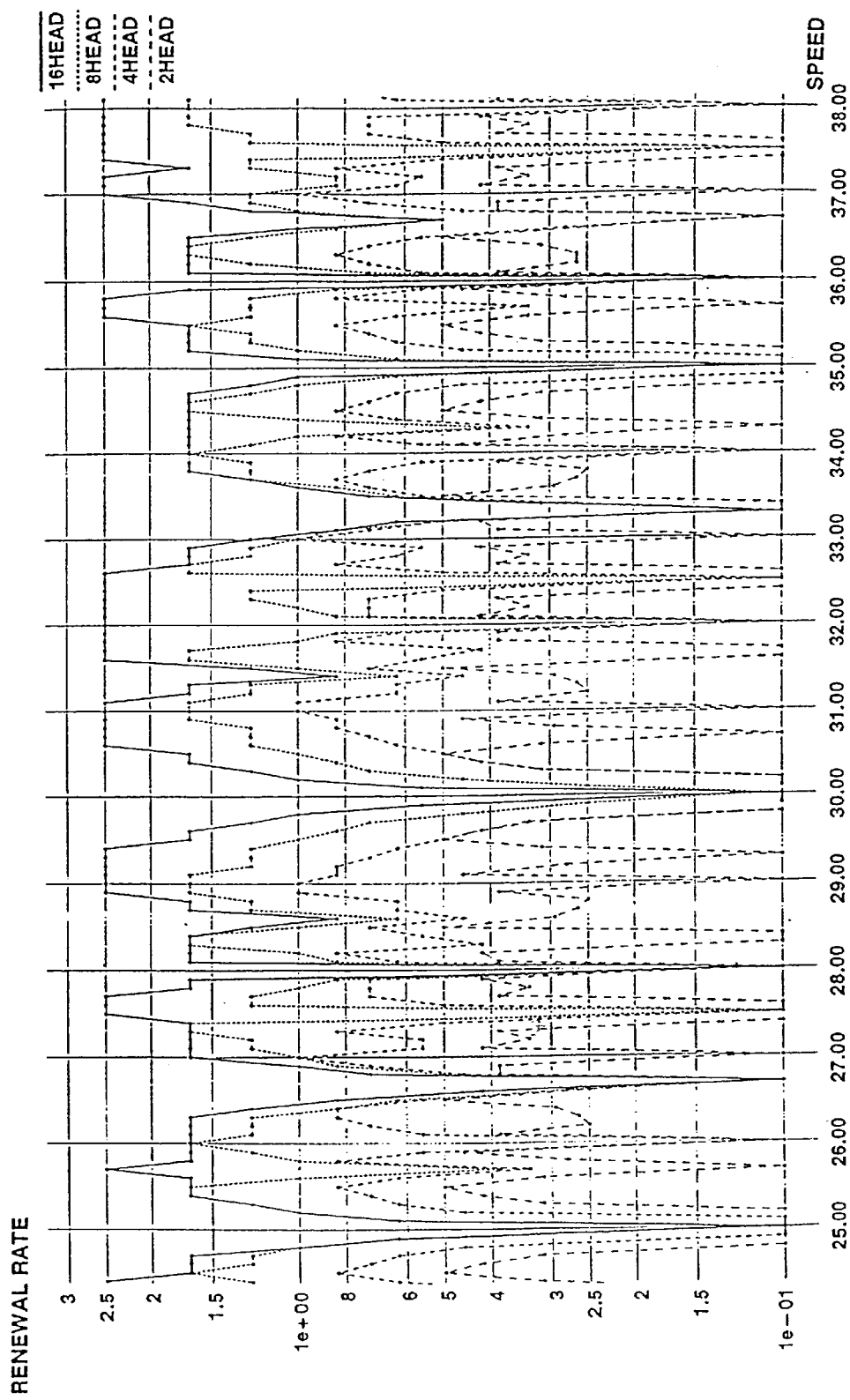
FIG. 27 is a third view following a second view showing an example of a result of calculation of a renewal rate of a screen in case of reproducing data of a NTSC method at each search speed.
Figure 28:
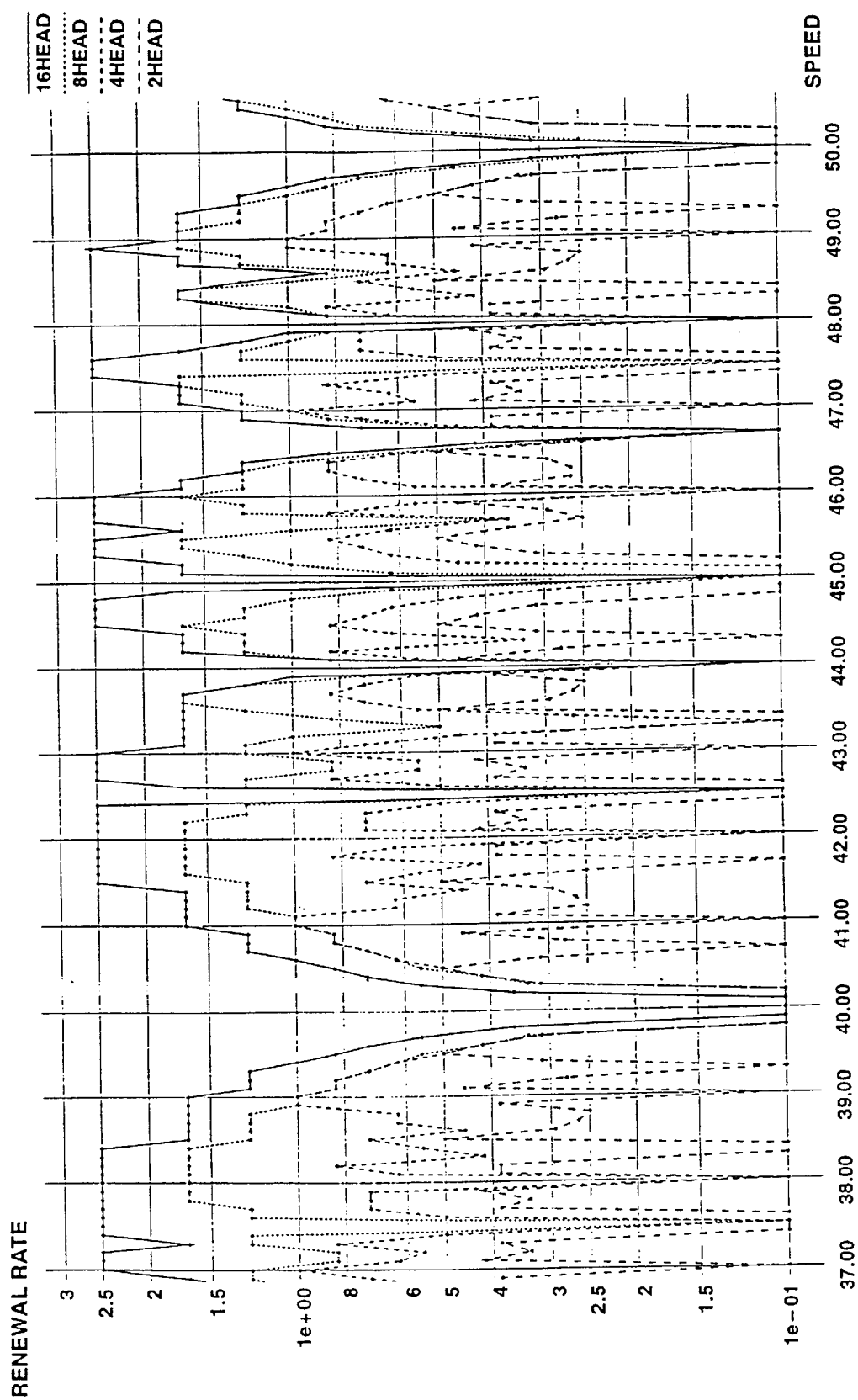
FIG. 28 is a fourth view following a third view showing an example of a result of calculation of a renewal rate of a screen in case of reproducing data of a NTSC method at each search speed.
Figure 29:
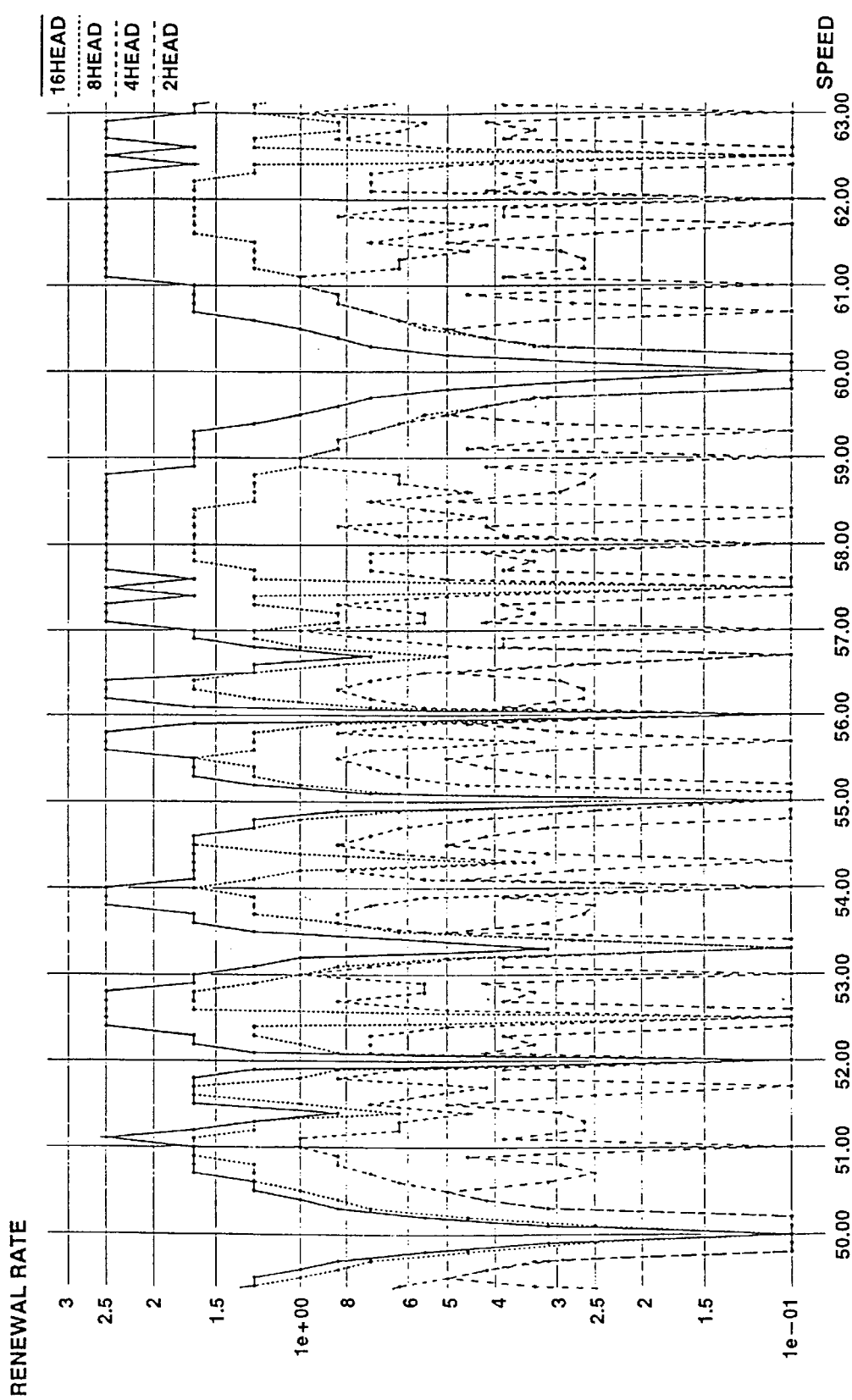
FIG. 29 is a fifth view following a fourth view showing an example of a result of calculation of a renewal rate of a screen in case of reproducing data of a NTSC method at each search speed.
Figure 30:
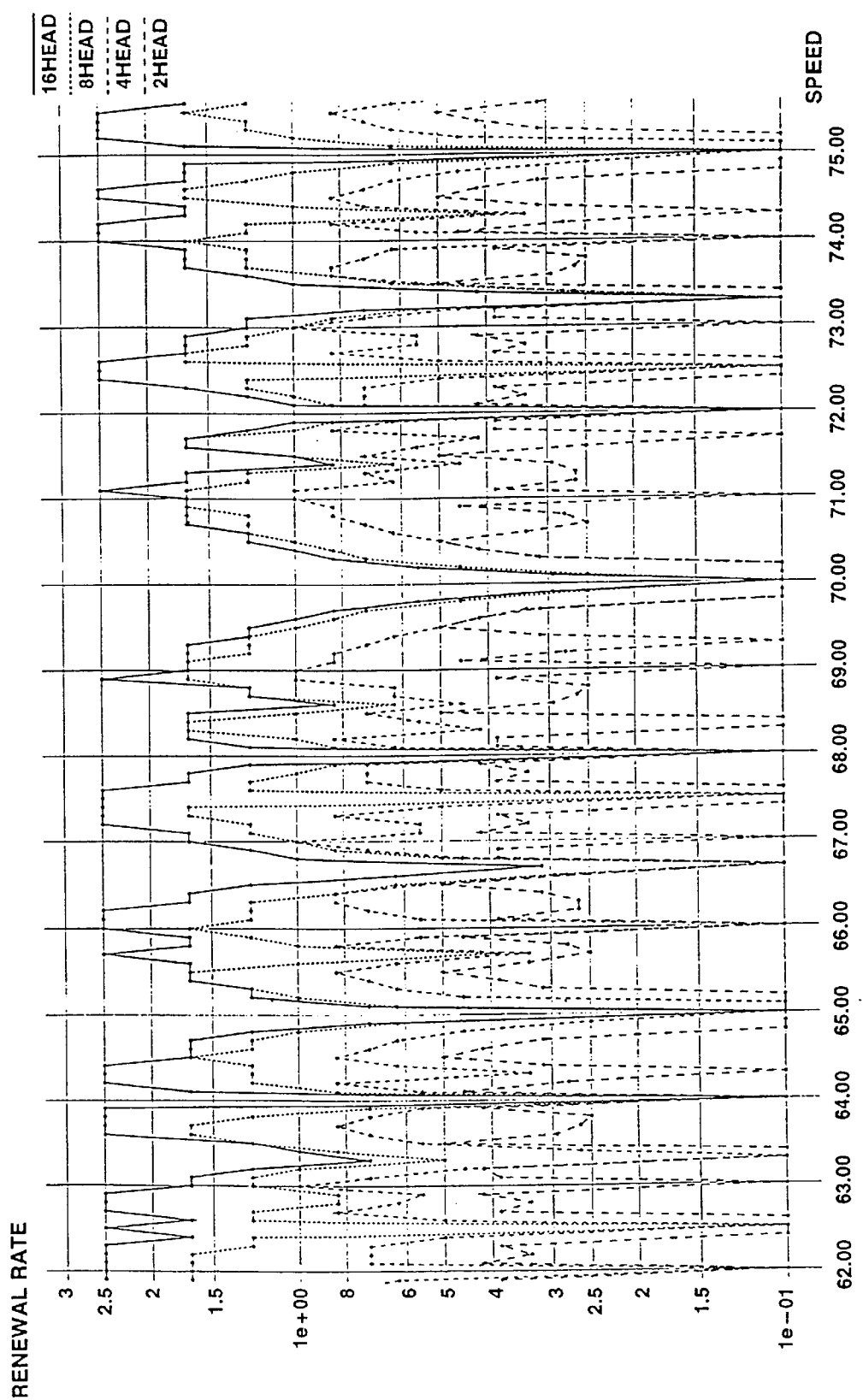
FIG. 30 is a sixth view following a fifth view showing an example of a result of calculation of a renewal rate of a screen in case of reproducing data of a NTSC method at each search speed.
Figure 31:
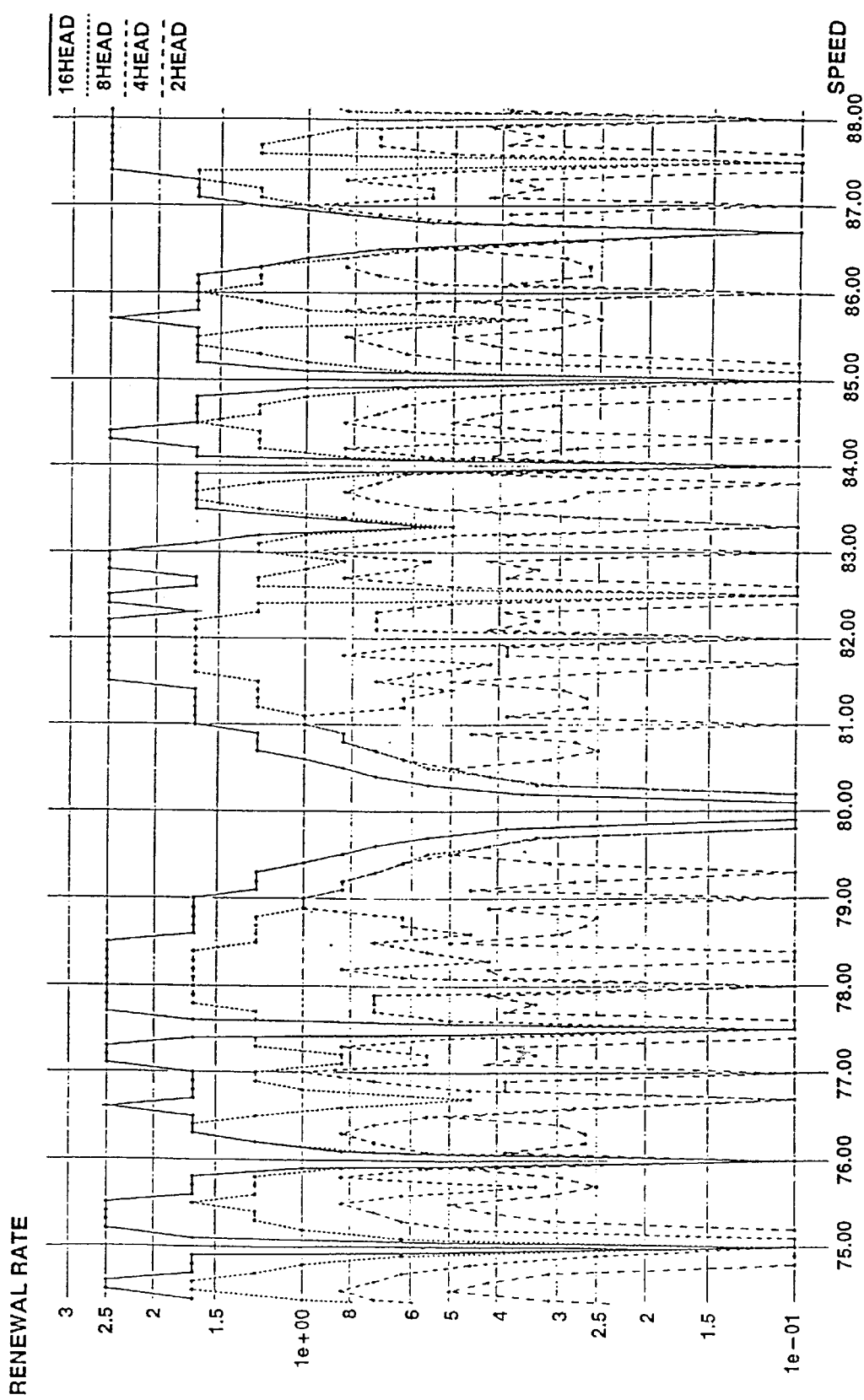
FIG. 31 is a seventh view following a sixth view showing an example of a result of calculation of a renewal rate of a screen in case of reproducing data of a NTSC method at each search speed.
Figure 32:
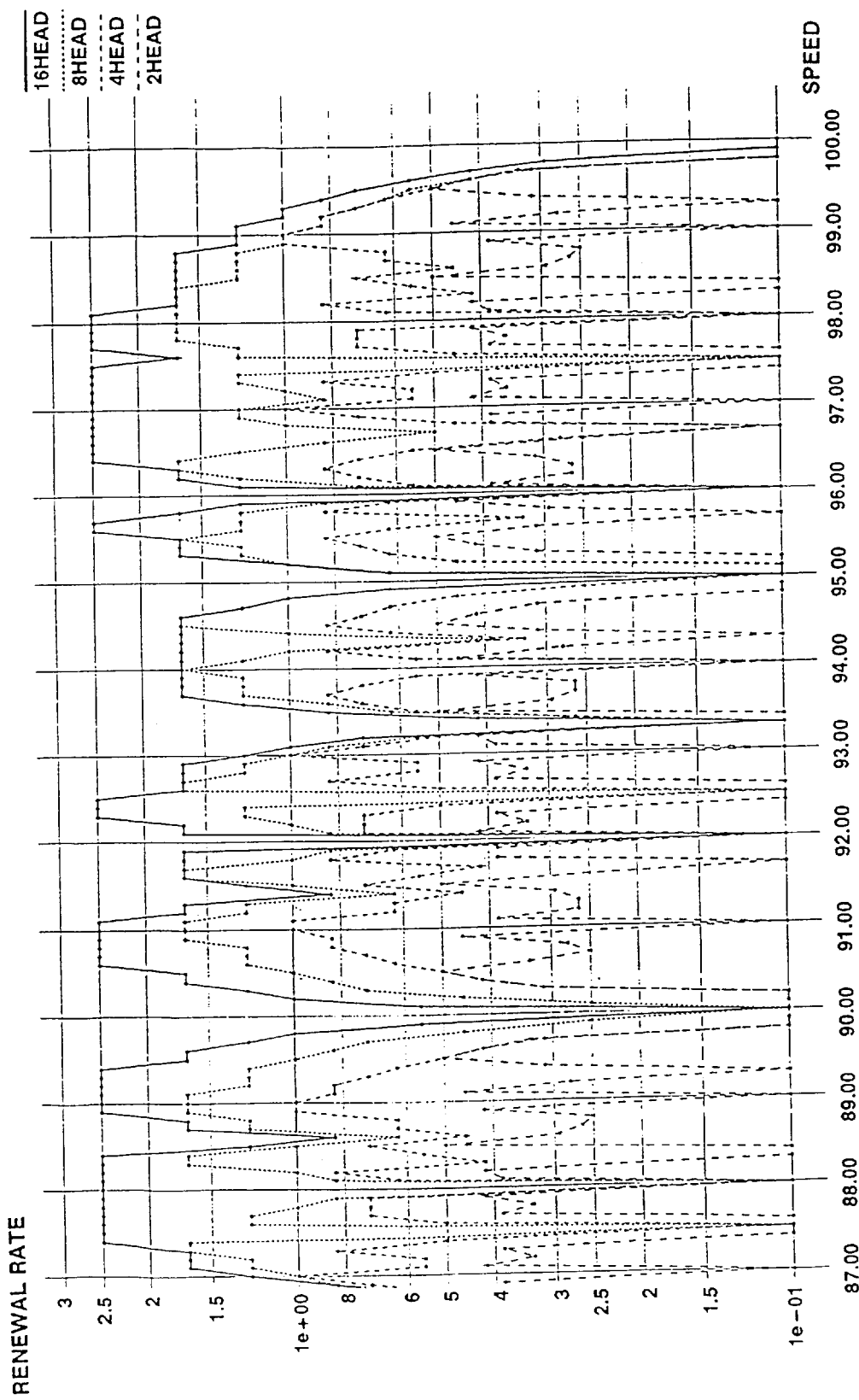
FIG. 32 is a eighth view following a seventh view showing an example of a result of calculation of a renewal rate of a screen in case of reproducing data of a NTSC method at each search speed.
Figure 33:
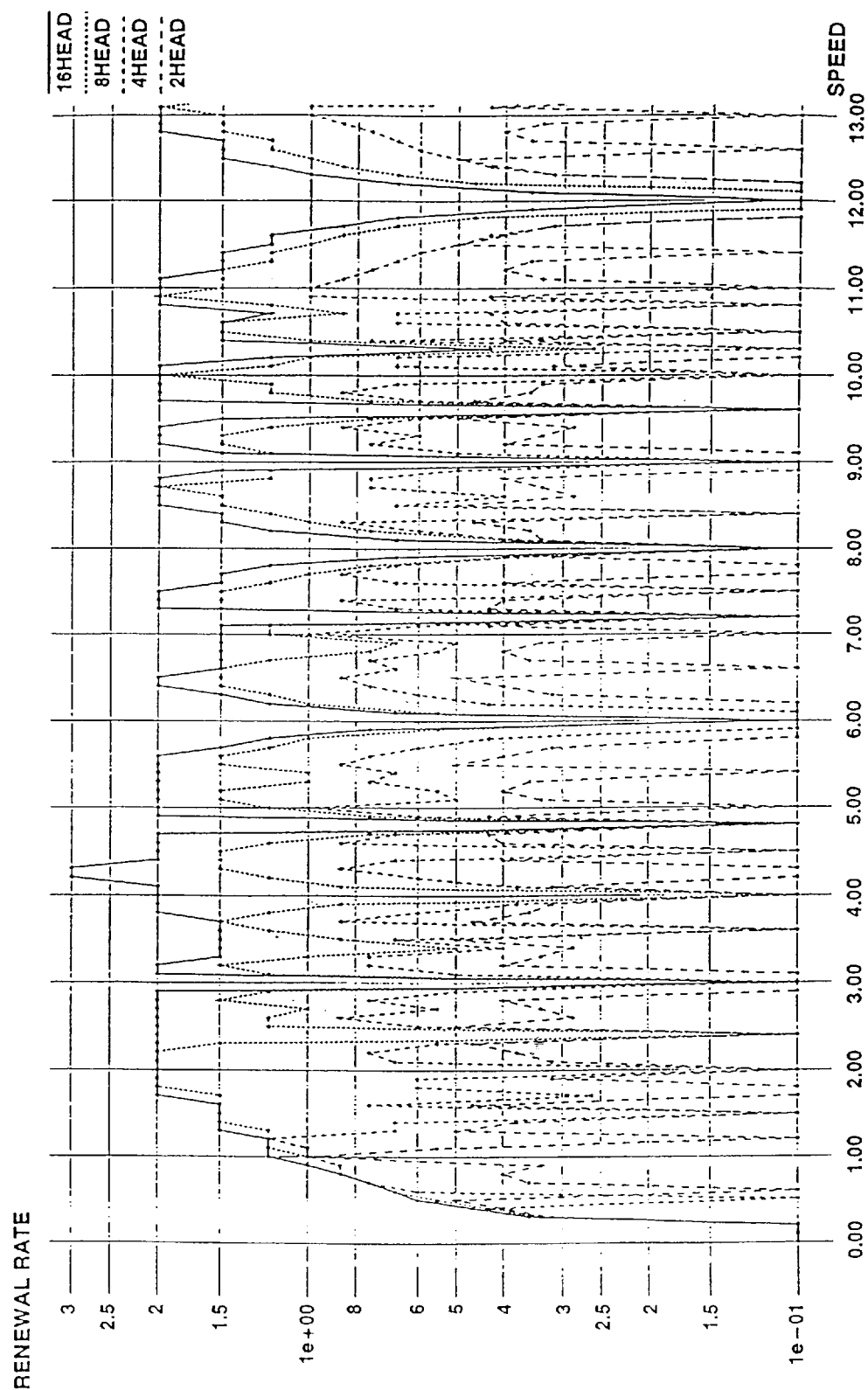
FIG. 33 is a first view showing an example of a result of calculation of a renewal rate of a screen in case of reproducing data of a PAL method at each search speed.
Figure 34:
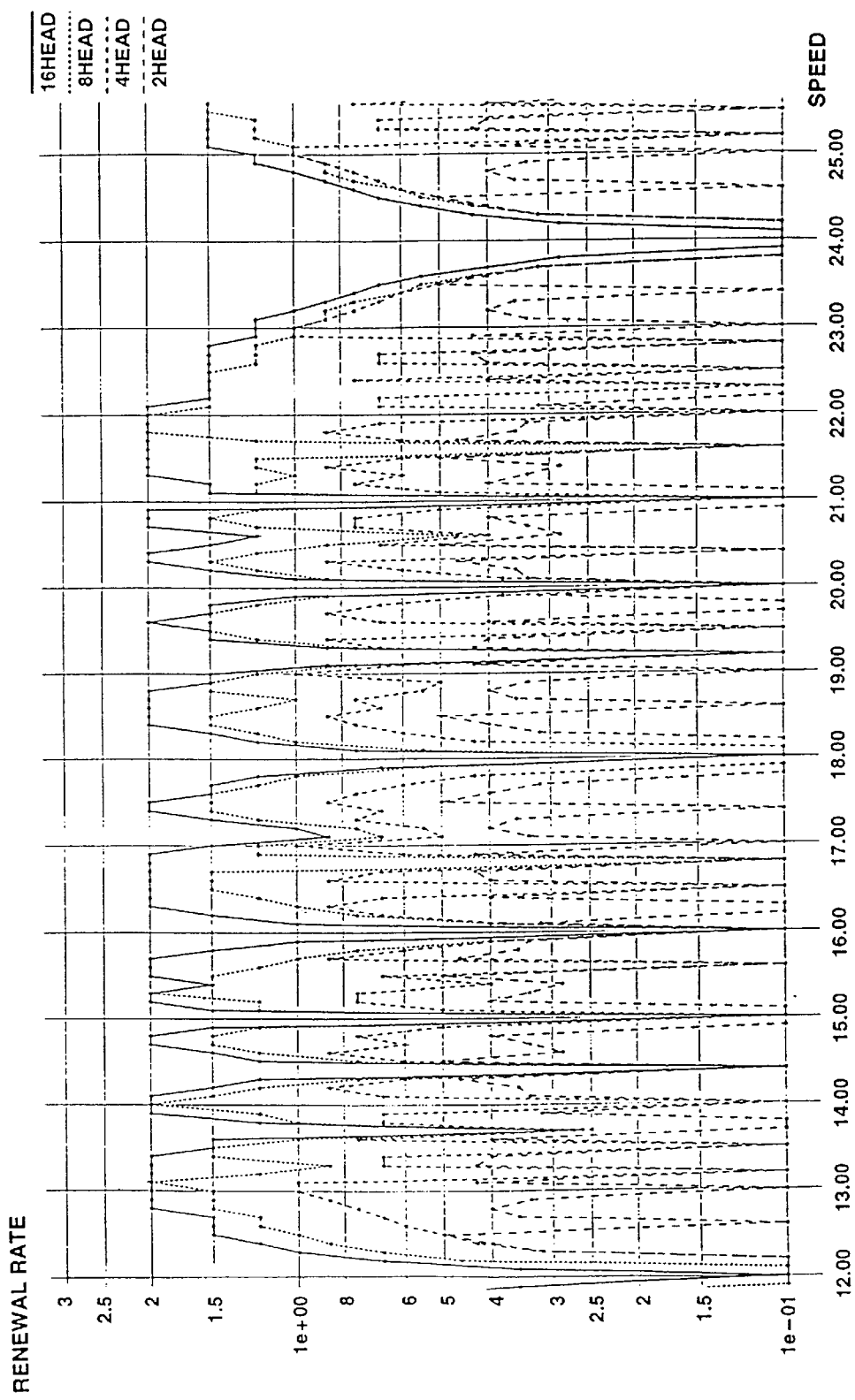
FIG. 34 is a second view following a first view showing an example of a result of calculation of a renewal rate of a screen in case of reproducing data of a PAL method at each search speed.
Figure 35:
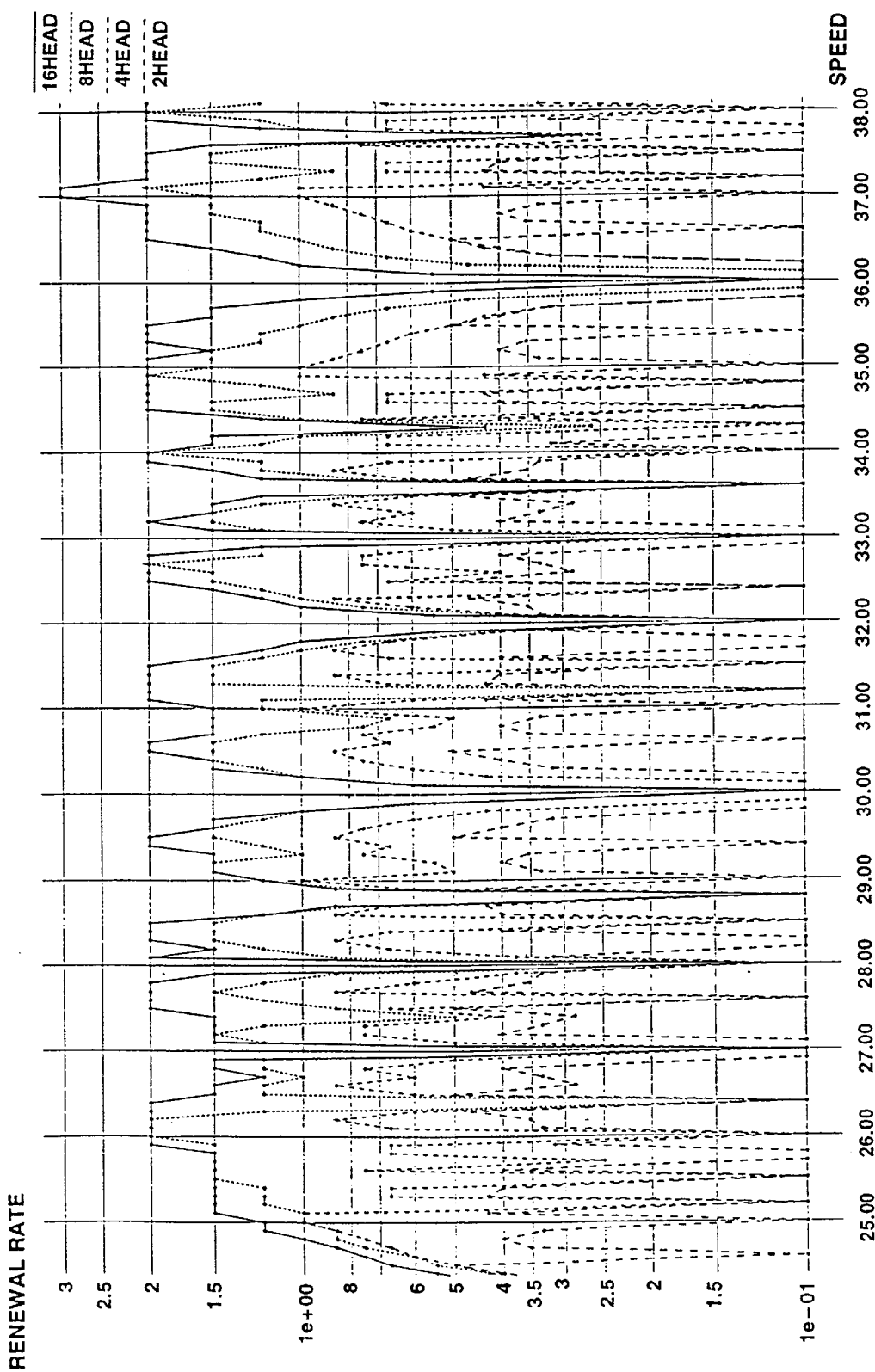
FIG. 35 is a third view following a second view showing an example of a result of calculation of a renewal rate of a screen in case of reproducing data of a PAL method at each search speed.
Figure 36:
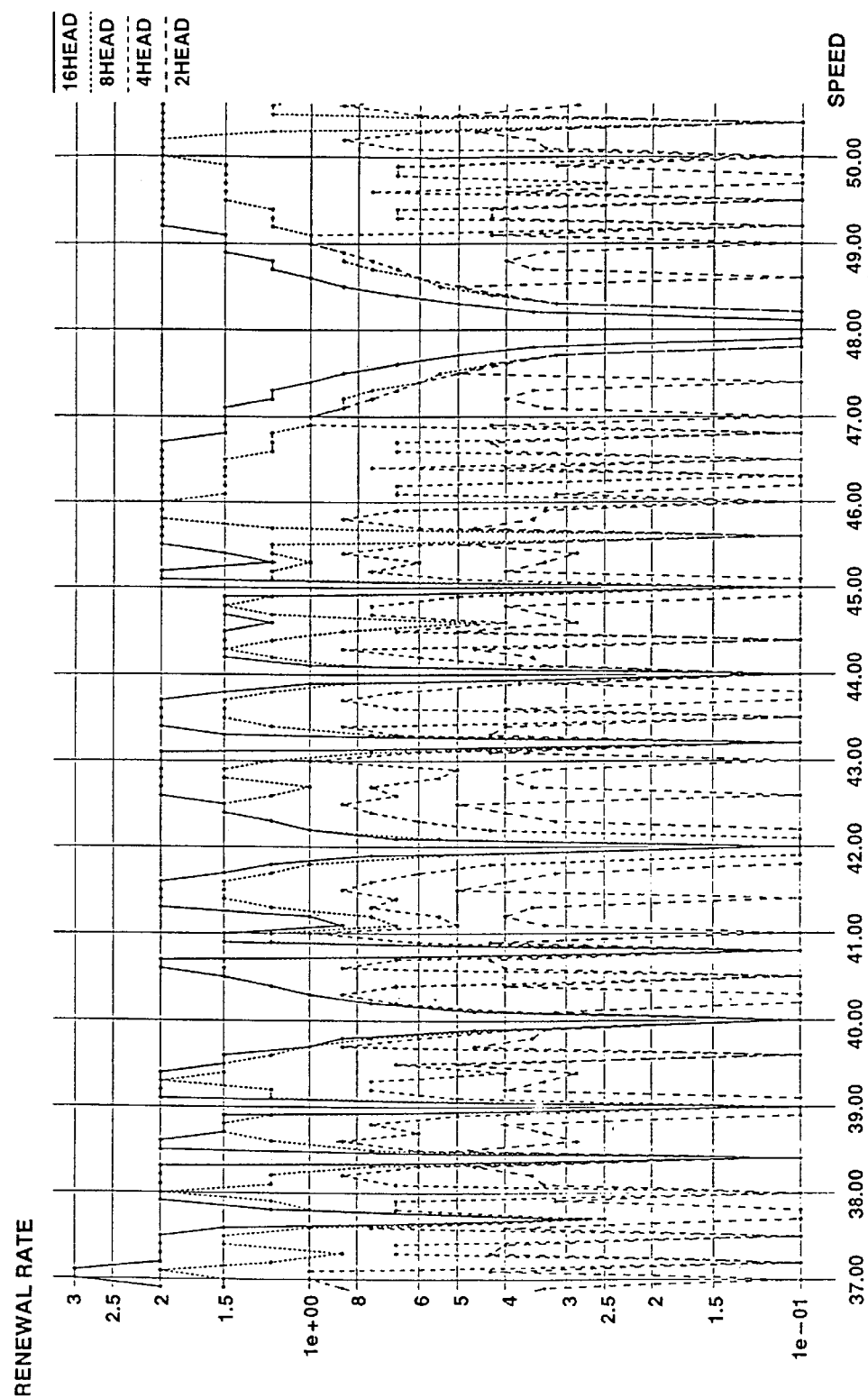
FIG. 36 is a fourth view following a third view showing an example of a result of calculation of a renewal rate of a screen in case of reproducing data of a PAL method at each search speed.
Figure 37:
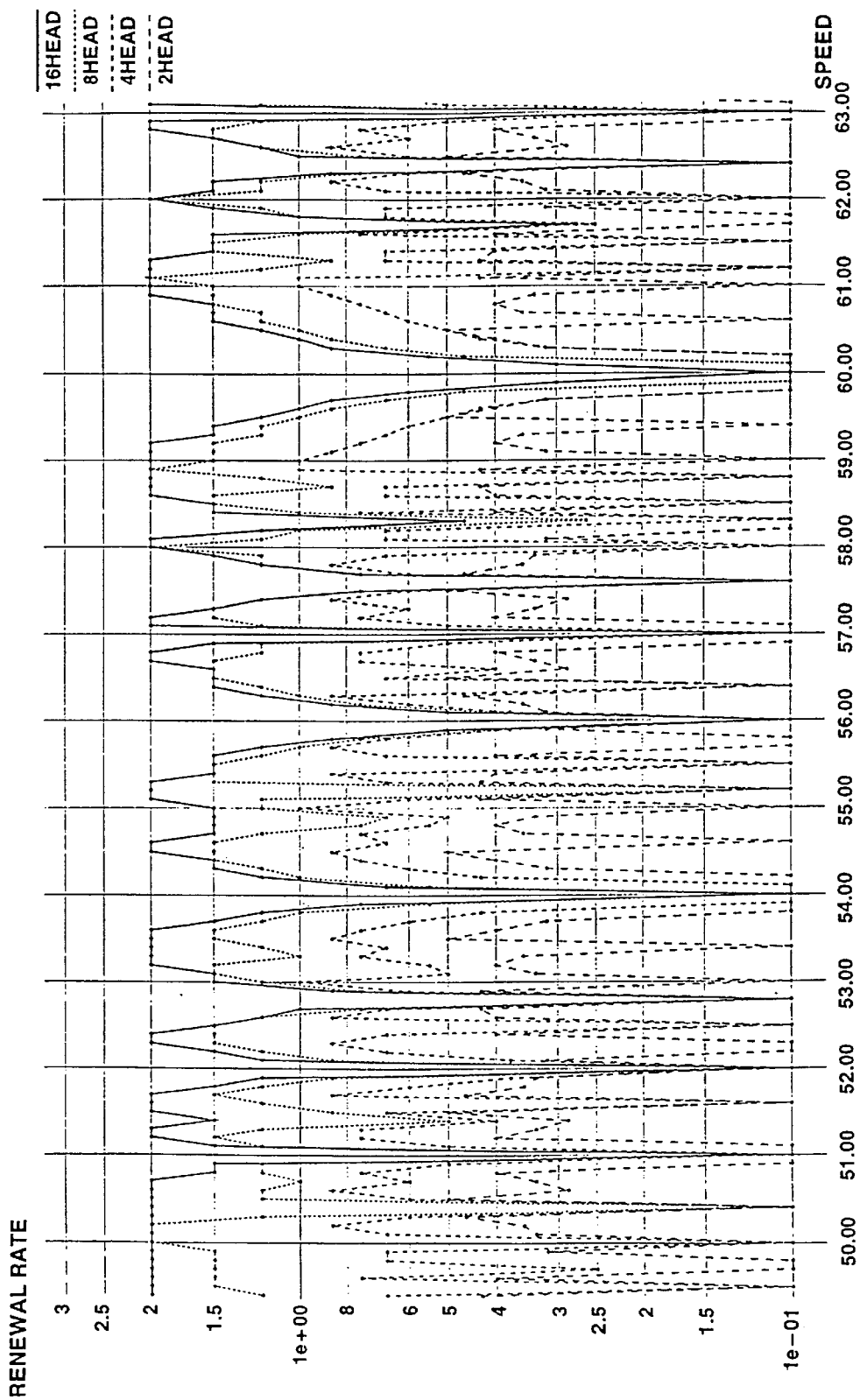
FIG. 37 is a fifth view following a fourth view showing an example of a result of calculation of a renewal rate of a screen in case of reproducing data of a PAL method at each search speed.
Figure 38:
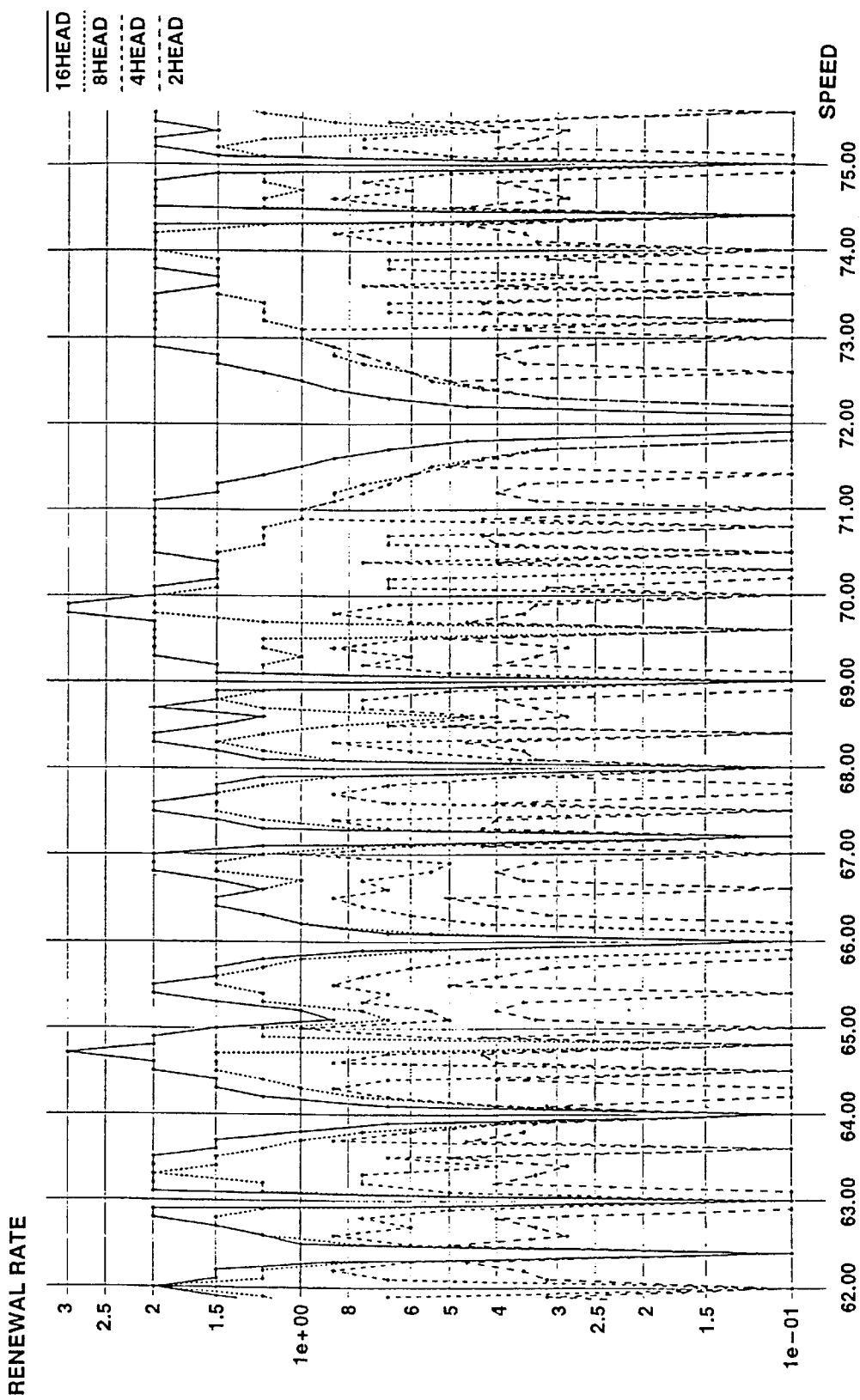
FIG. 38 is a sixth view following a fifth view showing an example of a result of calculation of a renewal rate of a screen in case of reproducing data of a PAL method at each search speed.
Figure 39:
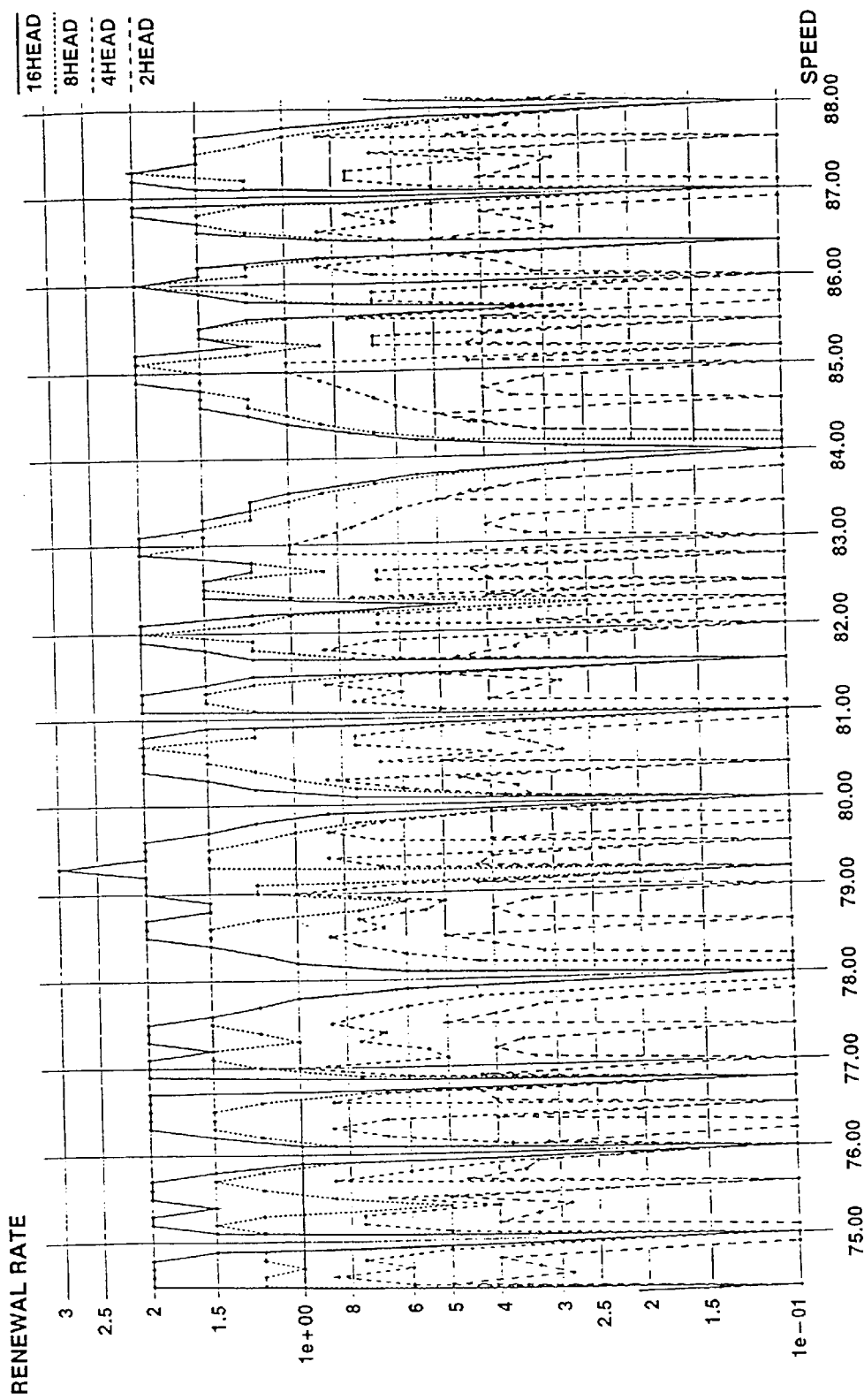
FIG. 39 is a seventh view following a sixth view showing an example of a result of calculation of a renewal rate of a screen in case of reproducing data of a PAL method at each search speed.
Figure 40:
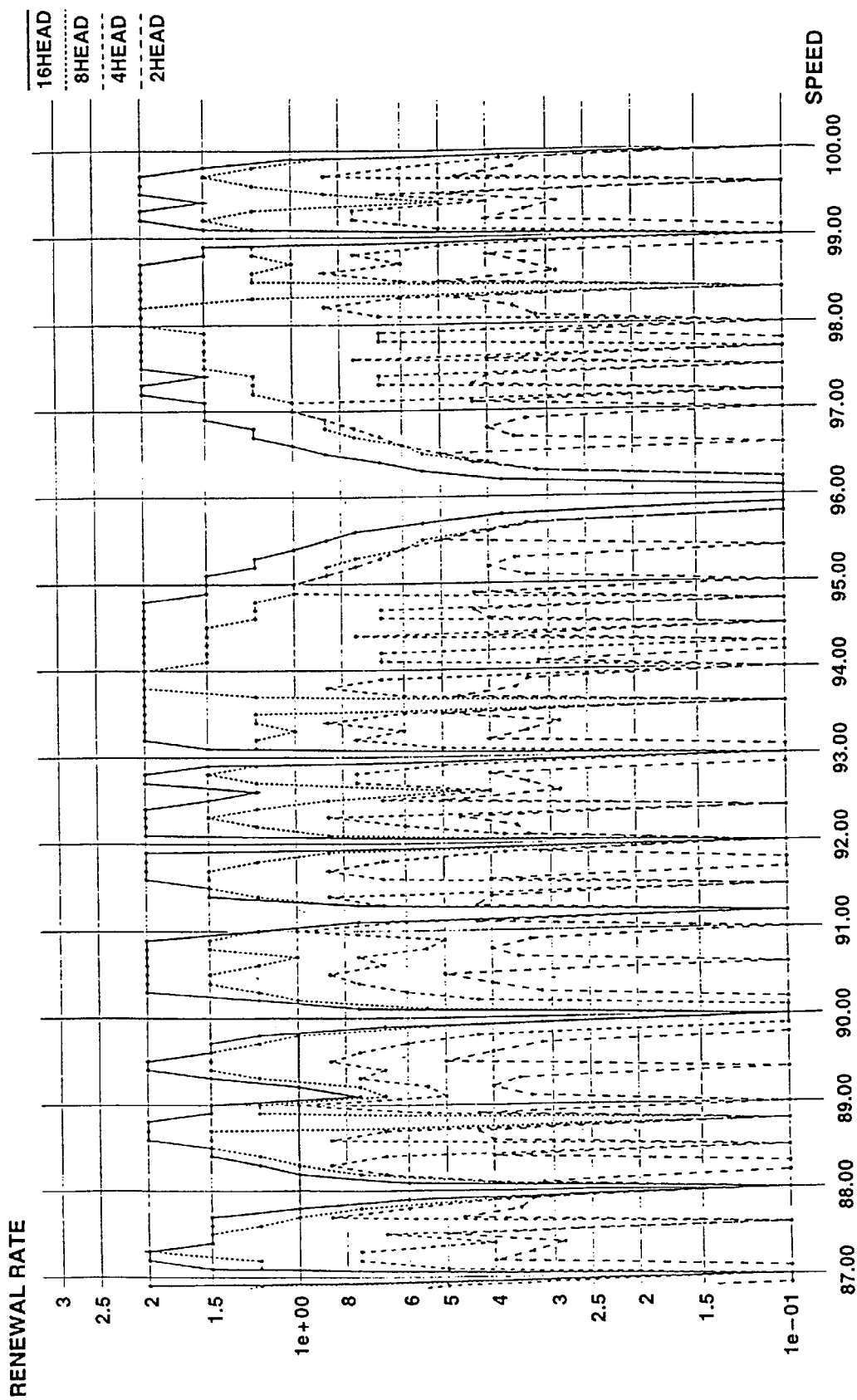
FIG. 40 is a eighth view following a seventh view showing an example of a result of calculation of a renewal rate of a screen in case of reproducing data of a PAL method at each search speed.

FIG. 24 is a flowchart showing a procedure for calculating by how many scanning number of a drum it is possible to read out all the Macro Blocks forming the screen by using the parameters of plural reproducing heads disposed on the drum.

At a step ST1, the rotating number of a drum, a track pitch, a track angle, original reproducing speed of tape speed in usually reproducing, an installed position (an angle disposed on the drum) and height of each reproducing head, an azimuth angle and so on are inputted as parameters.

At a step ST2, search speed is set. It is set to calculate at every speed of 0.1 times.

At a step ST3, a rushed position of each of other reproducing heads when the reproducing head of a reference is rushed into the fixed track.

At a step ST4, it is found at which track the reproducing head of the reference as above mentioned is rushed into again after rotating the drum once.

At a step ST5, the scanning number of the drums is set as a first, a second, a third scanning . . . .

At a step ST6, traces of the reproducing head of the reference and each of other reproducing heads at each scanning set at the step ST5.

At a step ST7, Macro Blocks reproduced by the traces calculated at the step ST6. Then conversion from coordinates on a magnetic tape to Macro Blocks on a screen and an azimuth angle are considered. Though not considering in calculation that results are illustrated in FIGS. 25 through 32 and FIGS. 33 through 40, calculation may be executed by taking in effect of the track alternation as above mentioned if necessary.

At a step ST8, the renewed Macro Blocks are searched and it is judged whether all the Macro Blocks forming one screen are renewed or not. When the result of judging is Yes, go to the step ST9. On the other hand, when the result of judging is No., return to the step ST5 and the similar calculation is repeated about next drum scanning.

At a step ST9, a renewal rate is calculated. Here, it is found from the drum scanning number necessary for renewing all the Macro Blocks forming one screen.

At a step ST10, each result found at processes as above mentioned is stored and the similar calculation is repeated after returning to the step ST2 about next speed.

Further, the calculated results stored here are stored into for example, a speed control apparatus and so on of a tape traveling system as control information if necessary.

A renewal rate of the screen defined as below mentioned is found by using "the minimum drum scanning number that it is possible to reproduce all the Macro Blocks forming one screen" found as above mentioned.

$$\text{Renewal Rate} = A \times (1/B) \tag{6}$$

Here, A is the drum scanning number necessary for renewing all the Macro Blocks forming one screen only by two reproducing heads in usually reproducing. Further, B is the minimum drum scanning number necessary for renewing all the Macro Blocks forming one screen.

FIGS. 25 through 32 shows renewal rates of the screen in case of reproducing the data of the NTSC method by each of 2, 4, and 8 heads configuration as shown in FIGS. 14 and 16 heads configuration as shown in FIG. 15 calculated by the procedure as shown in FIG. 24 and they are continuously calculated from FIGS. 25 to 32. Here, the 16 heads configuration is used as an example in case of the disposing of the heads shown in FIG. 15. The horizontal axis in each figure as above mentioned shows magnification (Speed) of the reproducing speed to the original reproducing speed and the vertical axis shows the renewal rate of the screen. It is known that the reproducing speed (search speed) which gives the high renewal rate of the screen to each head configuration from these figures.

FIGS. 33 through 40 show renewal rates of the screen in case of reproducing the data of the PAL method similarly calculated.

In each figure as above mentioned, each point is the search speed that the renewal rates of the screen are calculated at every speed of 0.1 times. Setting by choosing the search speed of the high renewal rate from this calculated result (avoiding the search speed that the renewal rate is low), it is possible to advance quality of a search picture by using effectively plural reproducing heads.

Further, it is known from the result of this calculation that the search speed as above mentioned, that is to say, the optimum search speed for the 4 heads configuration is the speed of 11 times about the speed of 10 times in case of the NTSC method, and the optimum search speed for the 8 heads configuration is the speed of 26 times about the speed of 24 times in case of the PAL method. Further, it is known that at the search speed given by the expressions (1) through (3), the renewal rate is good by each head configuration.

As above mentioned, it is possible to maximize the plural reproducing heads and advance sharply the quality of the search picture by setting the optimum search speed by every head configuration in reproducing an image signal recorded on the magnetic tape to the search picture by the plural reproducing heads according to the data reproducing method, the reproducing speed control apparatus and a reproducing apparatus of the present invention. As a result, the large blocks on the screen is successively renewed, therefore, it is possible to recognize easily the contents of moving pictures and to obtain the search picture with the high quality.

According to the present invention, traces of reproducing heads do not overlap each other, the proper tape speed is set for using effectively the data obtained by the plural reproducing heads, and it is possible to realized the search picture with the high quality though having 16 reproducing heads to realize the data transmitting function of the speed of 4 times by using the non-tracking method. Further, it is possible to improve the quality of the search picture by setting the proper search speed to the VCR system by using the calculating method according to the present invention to disposing of other various reproducing heads.

What is claimed is:

1. A data reproducing method that plural sets of reproducing heads disposed on a rotating drum reproduce data recorded on a magnetic tape at a speed faster than a fixed original reproducing speed, the data reproducing method characterized by comprising:

a first step for setting traveling speed of said magnetic tape based on a scanning number of said rotating drum needed to reproduce a fixed data unit and search speed parameters of a tape traveling system so that traces on said magnetic tape of the reproducing heads do not overlap each other for the number of sets of said plural reproducing heads, and a second step for traveling said magnetic tape at the traveling speed set by said first step and for reproducing the data recorded on said magnetic tape.

2. The data reproducing method according to claim 1 wherein said traveling speed of said magnetic tape set by said first step is given as follows:

$$(H_n/2) \times (T \times n \pm 1.0)$$

(n is an integer.)

here, $H_n$ is the number of sets of the reproducing heads and T is the number of tracks on said magnetic tape necessary for recording said fixed data unit.

3. The data reproducing method according to claim 2 wherein said fixed data unit is an image data forming one screen.

4. A data reproducing method according to claim 1 wherein said traveling speed of said magnetic tape set by said first step is decided so that the ratio of A to B is the maximum, A being the scanning number of said rotating drum that a set of reproducing heads set on the rotating drum is necessary for reproducing all the fixed data units at said original speed, and B being the minimum scanning number of said rotating drum that more than two sets of reproducing heads set on the rotating drum are necessary for reproducing all said fixed data units at said traveling speed.

5. The data reproducing method according to claim 1 wherein the reproducing heads are disposed on said rotating drum, plural sets of reproducing heads comprising a set of two reproducing heads having different azimuths each other; and said second step has a choosing step for choosing said data from the reproducing head that an error rate is small of said data reproduced from at least two heads having the same azimuth of said plural sets of reproducing heads when said data is reproduced by said reproducing head.

6. The data reproducing method according to claim 5 wherein data for correcting error of said data is added and recorded on said magnetic tape with said data, said choosing step, further, chooses said data from the reproducing head that an error rate is small of said data according to the error generated by an error correcting step for correcting the error of said data by using said recorded data for correcting the error, and by an error data generating step for generating the error data when it is impossible to reproduce said data by said error correction step.

7. The data reproducing method according to claim 1 wherein the data recorded on said magnetic tape is the data comprising compressed image data, the respective compressed image data is recorded a the fixed Macro Block unit, and said fixed Macro Block unit adjacent in the same image is shuffled to be recorded adjacent to said magnetic tape.

8. The data reproducing method according to claim 7 wherein for the purpose of being recorded adjacent on said magnetic tape by said fixed Macro Block units adjacent in the same image, the same image is horizontally divided into two areas which are further horizontally divided into two areas respectively, four divided areas are further vertically by the fixed unit, and said divided areas are recorded on said magnetic tape in order by said Macro Block units.

9. The data reproducing method according to claim 7 wherein the data recorded on said fixed Macro Block units adjacent in the same image is shuffling to be recorded adjacent said magnetic tape, and said fixed Macro Block units adjacent in the same image are included in different blocks respectively in the block unit for correcting an error of said data.

10. The data reproducing method according to claim 7 wherein the data recorded on said magnetic data is the data including the compressed image data, and said compression image data is recorded by the Block unit including the fixed Macro Block unit and the respective Block unit is the data that is recorded a direct current component of said compression image data from the head, next in order from a lowest frequency of recording said fixed data unit.

11. A reproducing speed control apparatus that plural sets of reproducing heads disposed on a rotating drum control to reproduce data recorded on a magnetic tape at a speed faster than a fixed original speed, the reproducing speed control apparatus characterized by comprising:

a setting means for setting traveling speed of said magnetic tape based on a scanning number of said rotating drum needed to reproduce a fixed data unit and search speed parameters of a tape traveling system so that traces on said magnetic tape of the reproducing heads do not overlap each other for the number of sets of said plural reproducing heads, and a reproducing control means for traveling said magnetic tape at the traveling speed set by said setting means and for reproducing the data recorded on said magnetic tape.

12. The reproducing speed control apparatus according to claim 11 wherein said traveling speed of said magnetic tape set by said setting means is the data given as follows:

$$(H_n/2) \times (T \times n \pm 1.0)$$

(n is an integer.)

here, $H_n$ is the number of sets of the reproducing heads and T is the number of tracks on said magnetic tape necessary for recording said fixed data unit.

13. The reproducing speed control apparatus according to claim 12 wherein the data of said fixed unit is an image data forming one screen.

14. The speed control apparatus according to claim 12 wherein the traveling speed of said magnetic tape given by claim 12 is decided so that the ratio of A to B is the maximum, A being the scanning number of said rotating drum that a set of reproducing heads provided on said rotating drum is necessary for reproducing all the fixed data units at the speed faster than said original speed, and B being the scanning number of said rotating drum that more than two sets of reproducing heads provided on said rotating drum are necessary for reproducing all said fixed data units at said traveling speed.

15. A reproducing apparatus that plural sets of reproducing heads disposed on a rotating drum reproduce data recorded on a magnetic tape at a speed faster than a fixed original speed, the reproducing apparatus characterized by comprising:

a traveling speed setting means for setting traveling speed of said magnetic tape based on a scanning number of said rotating drum needed to reproduce a fixed data unit and search speed parameters of a tape traveling system so that traces on said magnetic tape of the reproducing heads do not overlap each other for the number of sets of said plural reproducing heads, a tape traveling means for traveling said magnetic tape at the traveling speed set by said traveling speed setting means, and a reproducing means for reproducing said magnetic tape traveled by said tape traveling means.

16. The reproducing apparatus according to claim 15 wherein said traveling speed set by said traveling speed setting means is the data given as follows:

$$(H_n/2) \times (T \times n \pm 1.0)$$

(n is an integer.)
here, $H_n$ is the number of sets of the reproducing heads and T is the number of tracks on said magnetic tape necessary for recording said fixed data unit.

17. The reproducing apparatus according to claim 15 wherein said fixed data unit is an image data forming one screen.

18. The reproducing apparatus according to claim 16 wherein it is decided that the ratio of A to B is the maximum, A being the scanning number of said rotating drum that a set of reproducing heads provided on said rotating drum is necessary for reproducing all the fixed data units at said original speed, and B being the minimum scanning number of said rotating drum that more than two sets of reproducing heads provided on said rotating drum are necessary for reproducing all said fixed data units at said traveling speed.

19. The data reproducing apparatus according to claim 15 wherein
the reproducing heads are disposed on said rotating drum, plural sets of reproducing heads comprising a set of two reproducing heads having different azimuths each other; and
said reproducing means has further a choosing means for choosing said data from the reproducing head that an error rate is small of said data reproduced from at least two heads having the same azimuth of said plural sets of reproducing heads when said data is reproduced by said reproducing head.

20. The reproducing apparatus according to claim 19 wherein
correcting error of said data is added and recorded on said magnetic tape with said data,
said choosing means, further, chooses said data from the reproducing head that an error rate is small of said data according to the error generated by an error correcting means for correcting the error, and by an error data generating means for generating the error data when it is impossible to reproduce said data by said error correcting means.

21. The reproducing apparatus according to claim 15 wherein the data recorded on said magnetic tape is the data comprising compressed image data, the respective compressed image data is recorded by a fixed Macro Block unit, and said fixed Macro Block unit adjacent in the same image is shuffled to be recorded adjacent to said magnetic tape.

22. The reproducing apparatus according to claim 21 wherein for the purpose of being recorded adjacent on said magnetic tape by said fixed Macro Block units adjacent in the same image, the same image is horizontally divided into two areas which are further horizontally divided into two areas respectively, four divided areas are further vertically by the fixed unit, and said divided areas are recorded on said magnetic tape in order by said Macro Block units.

23. The reproducing apparatus according to claim 21 wherein the data recorded on said fixed Macro Block units adjacent in the same image is shuffling to be recorded adjacent said magnetic tape, and said fixed Macro Block units adjacent in the same image are included in different blocks respectively in the block unit for correcting an error of said data.

24. The reproducing apparatus according to claim 21 wherein the data recorded on said magnetic data is the data including the compressed image data, and said compression image data is recorded by a Block unit including the fixed Macro Block unit and the respective Block unit is the data that is recorded the direct current component of said compression image data from the head, next in order from the lowest frequency of said compression image data.

* * * * *